(12) United States Patent
Uysal et al.

(10) Patent No.: US 11,809,475 B2
(45) Date of Patent: Nov. 7, 2023

(54) REPRESENTATION AND VISUALIZATION OF MULTIVARIATE SENSORY TIME SERIES DATA

(71) Applicant: University of South Florida, Tampa, FL (US)

(72) Inventors: Ismail Uysal, Lakeland, FL (US); Alla Abdella, West Hartford, CT (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 217 days.

(21) Appl. No.: 17/550,509

(22) Filed: Dec. 14, 2021

(65) Prior Publication Data

US 2022/0188343 A1  Jun. 16, 2022

Related U.S. Application Data

(60) Provisional application No. 63/159,804, filed on Mar. 11, 2021, provisional application No. 63/199,199, filed on Dec. 14, 2020.

(51) Int. Cl.
   G06F 16/00     (2019.01)
   G06F 16/35     (2019.01)
   G06N 20/00     (2019.01)

(52) U.S. Cl.
   CPC .......... *G06F 16/353* (2019.01); *G06N 20/00* (2019.01)

(58) Field of Classification Search
   None
   See application file for complete search history.

(56) References Cited

U.S. PATENT DOCUMENTS

| | | | | |
|---|---|---|---|---|
| 9,225,793 | B2 * | 12/2015 | Dutta | H04L 67/12 |
| 10,628,289 | B2 * | 4/2020 | Gupta | G06F 11/3495 |
| 11,709,159 | B2 * | 7/2023 | Koeppel | G01N 33/24 |
| | | | | 702/2 |

* cited by examiner

*Primary Examiner* — Debbie M Le
(74) *Attorney, Agent, or Firm* — QUARLES & BRADY LLP

(57) ABSTRACT

In accordance with some embodiments, systems, methods, and media for processing and representing multivariate sensor information gathered from multiple sources are provided. In some embodiments, the method comprises: receiving a data sequences from respective sources; identifying a shortest data sequence that corresponds to a first interval; calculating, for pairs of data sequences, a similarity value over the first interval; forming a first segment of a representative data sequence that is a weighted combination of the data sequences over the first interval based on similarity values associated with the data sequences; truncating at least a subset of data sequences to exclude elements corresponding to the first interval; identifying a shortest data sequence corresponding to a second interval; forming a second segment of the representative data sequence based on similarity values associated with the data sequences; and concatenating the first segment and the second segment of the representative data sequence.

20 Claims, 25 Drawing Sheets

Algorithm 1: Correlation Weighted - Moving Average Coefficient (CW-MAC)

Input: $\Omega_{input} = \{\mathcal{X}_1^{n_1^{[0]}}, \mathcal{X}_2^{n_2^{[1]}}, ..., \mathcal{X}_i^{n_i^{[k]}}\}$
Output: A compound time-series signal that represents all the variable-length input signals.

foreach *sensor i in allsensors* do
    foreach *shipment j in allshipments* do
        Select same location time-series across different shipments $j$:
        Order set $\Omega_{input}$ in ascending order
        Apply clipping to all vectors to achieve the same size as the shortest one $\mathcal{X}_i^{n_i^{[0]}}$
    end
    Compute $k$ Pearson's Correlation coefficients to form a temporal matrices where:
$$\sigma_{xy} = \frac{\sum_{i=1}^{n_i^{[0]}}(x_i - \bar{x}_k)(y_i - \bar{y}_k)}{\sqrt{\sum_{i=1}^{n_i^{[0]}}(x_i - \bar{x}_k)^2}\sqrt{\sum_{i=1}^{n_i^{[0]}}(y_i - \bar{y}_k)^2}}$$

Compute a normalized weight coefficients for each row of different coefficients in the matrix by: $\mathcal{W}_i^{[p]} = \frac{\sum_{j=1}^{k} \sigma_{(p+1)j} - 1}{(\sum_{i=1}^{k}\sum_{j=1}^{k}\sigma_{ij}-1)-m}$ while $\mathcal{W}_i^{[p]} \neq \mathcal{W}_1^{[k]} = 1$ do
        Compute $\{\mathcal{W}_{m-1}^{[k-1]}, \mathcal{W}_{m-2}^{[k-2]}, ..., 1\}$
        Combine the input signals in each group using the weight as:
        $\hat{\mathcal{X}}_{group_1}^{[1]} = \mathcal{W}_k^{[1]}.\mathcal{X}_i^{[1][0:n_i^{[0]}]} + \mathcal{W}_k^{[2]}.\mathcal{X}_i^{[2][0:n_i^{[0]}]} + \mathcal{W}_k^{[3]}.\mathcal{X}_i^{[3][n_i^{[0]}:n_i^{[1]}]} + ... \mathcal{W}_k^{[k]}.\mathcal{X}_i^{[k][0:n_i^{[0]}]}$
        $\hat{\mathcal{X}}_{group_2}^{[2]} = \mathcal{W}_{k-1}^{[1]}.\mathcal{X}_i^{[2][n_i^{[0]}:n_i^{[1]}]} + \mathcal{W}_{k-1}^{[3]}.\mathcal{X}_i^{[3][n_i^{[1]}:n_i^{[2]}]} + ... \mathcal{W}_{k-1}^{[k]}.\mathcal{X}_i^{[k][n_i^{[0]}:n_i^{[1]}]}$
        $\hat{\mathcal{X}}_{group_3}^{[3]} = \mathcal{W}_{k-2}^{[1]}.\mathcal{X}_i^{[3][n_i^{[1]}:n_i^{[2]}]} + \mathcal{W}_{k-2}^{[4]}.\mathcal{X}_i^{[4][n_i^{[2]}:n_i^{[3]}]} + ... \mathcal{W}_{k-2}^{[k]}.\mathcal{X}_i^{[k][n_i^{[2]}:n_i^{[3]}]}$
        $\vdots = \vdots$
        $\hat{\mathcal{X}}_{group_k}^{[k]} = \mathcal{W}_1^{[k]}.\mathcal{X}_i^{[k][n_i^{[k-1]}:n_i^{[k]}]}$
        Finally form one time-series signal by concatenate the $\hat{\mathcal{X}}_{group_i}^{[j]}$.
        $\hat{\mathcal{X}}_i^{[Representative]} = [\hat{\mathcal{X}}_{group_1}^{[1]}, \hat{\mathcal{X}}_{group_2}^{[2]}, ...]$
    end
end

*FIG. 8*

Algorithm II: Dynamic Time Warping Moving Average Coefficient (DTW-MAC)

Input: $\Omega_{input} = \{\mathcal{X}_i^{n^{[0]}}, \mathcal{X}_i^{n^{[1]}}, \ldots, \mathcal{X}_i^{n^{[k]}}\}$

Output: A compound time-series signal that represents all the variable-length input signals.

Repeat the first steps similar to the CW-MAC: ordering, and clipping.

Compute $k$ Dynamic time warping coefficients to form a nonlinear alignment matrices of distances:

Initial: $dis = list[\ ], DTW = dict\{\}$ foreach *sensor i in group k* do
    DTW[(i, -1)] = float('infinite')
    DTW[(-1, i)] = float('infinite')
    DTW[-1, -1)] = 0 end foreach *sensor j in* $n^{[0]}$ do
    foreach *sensor j in* $n^{[0]}$ do
        # {if i is equal to j, then (dist = 0)}
        $dist = |(sensor i[i] - sensor i[j])|$
        $dis.append(dist)$
        $DTW[(i,j)] = dist + min\{DTW[(i-1,j)], DTW[(i,j-1)], DTW[(i-1,j-1)]\}$
        $d = \sqrt{(DTW[n_i[0]-1, n_i[0]-1])}$
    end
end

Compute a normalized weight coefficients for each row of different coefficients in the matrix by:

$$\mathcal{W}_i^{[p]} = \left(\frac{\sum_{j=1}^{k} d_{(p+1)-1}}{\sum_{j=1}^{k}(\sum_{j=1}^{k}(d_{i,j}-1)-m}\right)^{-1}$$

while $\mathcal{W}_i^{[p]} \neq \mathcal{W}_1^{[k]} = 1$ do

Compute $\{\mathcal{W}_m^{[k-1]}, \mathcal{W}_{m-2}^{[k-2]}, \ldots, 1\}$
    Combine the input signals in each group using the weights as similar to equations 4, 5, 6 and 7:
    Compute: $[\hat{\mathcal{X}}_{group_1}^{[1]}, \hat{\mathcal{X}}_{group_2}^{[2]}, \hat{\mathcal{X}}_{group_3}^{[3]}, \hat{\mathcal{X}}_{group_k}^{[k]}]$ Finally form one time-series signal by concatenate the $\hat{\mathcal{X}}_{group_i}^{[j,i]}$.
    $\hat{\mathcal{X}}_i^{[Representative]} = [\hat{\mathcal{X}}_{group_1}^{[1]}, \hat{\mathcal{X}}_{group_2}^{[2]}, \ldots]$ end

*FIG. 9*

Algorithm III: Unity Weighted Moving Average Coefficient (UW-MAC)

Input: $\Omega_{input} = \{ \mathcal{X}_i^{n_i^{[0]}}, \mathcal{X}_i^{n_i^{[1]}}, \ldots, \mathcal{X}_i^{n_i^{[k]}} \}$
Output: A compound time-series signal that represents all the variable-length input signals.

foreach *sensor i in all sensors* do
    foreach *shipment j in all shipments* do
        Select same location time-series across different shipments $j$;
        Order set $\Omega_{input}$ in ascending order
        Apply clipping to all vectors to achieve the same size as the shortest one $\mathcal{X}_i^{n_i^{[0]}}$
    end
    Compute Moving Average (MA) on the first group of $m$ clipped signals to form a combined averaged time-series with length is equal to: $n_1$
    Compute:
$$\hat{\mathcal{X}}_{group_1}^{[0]} = \frac{1}{k} * (\mathcal{X}_1^{n_1^{[0]}} + \mathcal{X}_2^{n_2^{[0]}} + \ldots \mathcal{X}_k^{n_k^{[0]}})$$
$$\hat{\mathcal{X}}_{group_2}^{[1]} = \frac{1}{k-1} * (\mathcal{X}_2^{n_2^{[1]}} + \mathcal{X}_3^{n_3^{[1]}} + \ldots \mathcal{X}_k^{n_k^{[1]}-1})$$
$$\hat{\mathcal{X}}_{group_3}^{[2]} = \frac{1}{k-2} * (\mathcal{X}_3^{n_3^{[2]}} + \mathcal{X}_4^{n_4^{[2]}} + \ldots \mathcal{X}_k^{n_k^{[2]}-2})$$
$$\ldots = \ldots$$
$$\hat{\mathcal{X}}_{group_1}^{[k]} = \mathcal{X}_b^{[k]n^{[k-1:k]}}$$

Finally form one time-series signal by concatenate the $\hat{\mathcal{X}}_{group_1}^{[js]}$.
$$\hat{\mathcal{X}}_{set_1}^{[TOTAL]} = [\hat{\mathcal{X}}_{group_1}^{[0]}, \hat{\mathcal{X}}_{group_1}^{[1]}, \ldots, \hat{\mathcal{X}}_{group_1}^{[k]}]$$
end

*FIG. 10*

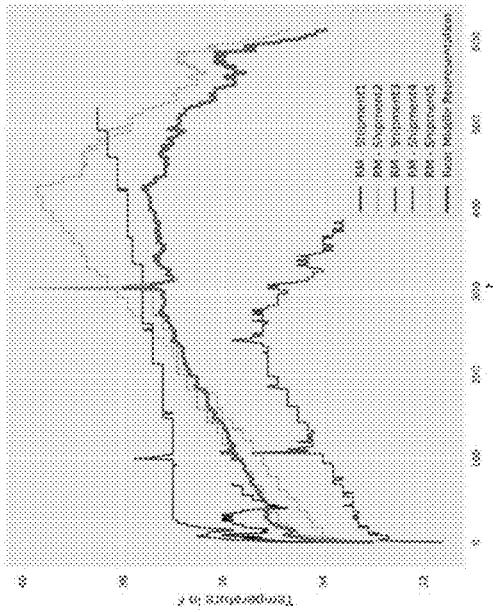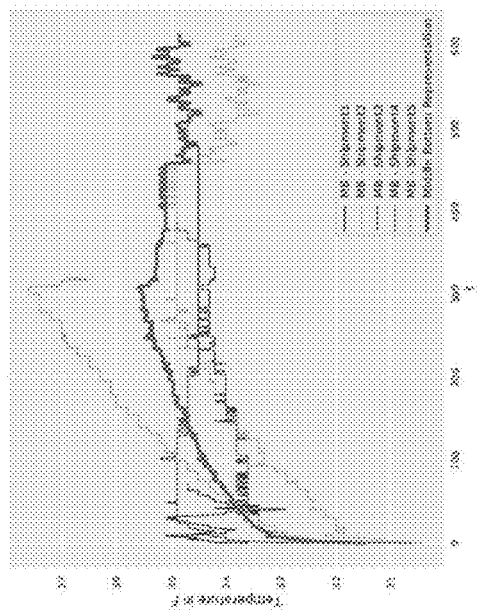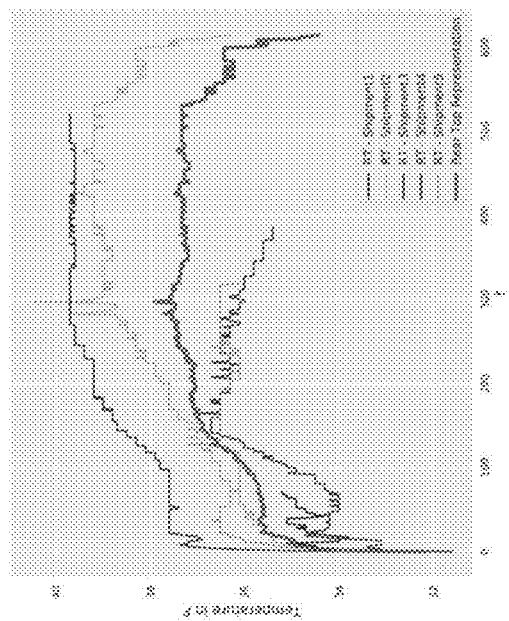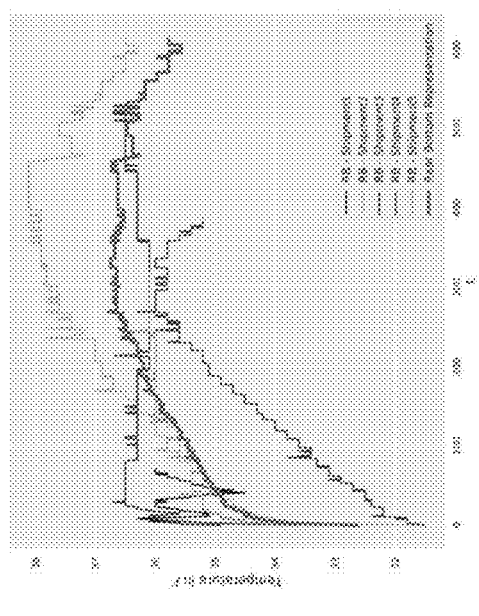
FIG. 16

TABLE 2 – BEST PERFORMING ACCURACY SPLIT BY DOMAIN TYPE

| Domain Type | CW-MAC Accuracy | Baseline Accuracy |
|---|---|---|
| Device | 0.513 | 0.416 |
| ECG | 0.767 | 0.789 |
| EPG | 1.000 | 1.000 |
| Image | 0.658 | 0.657 |
| Motion | 0.658 | 0.661 |
| Power | 0.900 | 0.911 |
| Sensor | 0.764 | 0.726 |
| Simulated | 0.702 | 0.705 |
| Spectro | 0.728 | 0.728 |
| Spectrum | 0.527 | 0.545 |
| Traffic | 0.789 | 0.780 |
| Total Average | 0.701 | 0.689 |

TABLE 3 – BEST PERFORMING ACCURACY SPLIT BY NUMBER OF CLASSES

| Number of Classes | CW-MAC Accuracy | Baseline Accuracy |
|---|---|---|
| 2 | 0.706 | 0.687 |
| 3 | 0.711 | 0.710 |
| 4 | 0.708 | 0.698 |
| 5 | 0.656 | 0.656 |
| 6 | 0.648 | 0.661 |
| 7 | 0.675 | 0.629 |
| 8 | 0.744 | 0.745 |
| 10 | 0.675 | 0.655 |
| Total Average | 0.701 | 0.689 |

*FIG. 23*

TABLE 4 – AVERAGE ACCURACY OF CW-MAC AND UW-MAC (BASELINE) OVER 70 PROBLEMS

*FIG. 24*

REPRESENTATION AND VISUALIZATION OF MULTIVARIATE SENSORY TIME SERIES DATA

CROSS-REFERENCE TO RELATED APPLICATIONS

This application is based on, claims the benefit of, and claims priority to U.S. Provisional Application No. 63/199,199, filed Dec. 14, 2020, and U.S. Provisional Application No. 63/159,804, filed Mar. 11, 2021. Each of the preceding applications is hereby incorporated herein by reference in its entirety for all purposes.

STATEMENT REGARDING FEDERALLY SPONSORED RESEARCH

This invention was made with government support under Grant No. 024863 awarded by the United States Department of Agriculture Specialty Crops Block Grant Program administered by the Florida Department of Agriculture and Consumer Services. The Government may have certain rights in the invention.

BACKGROUND

It has become increasingly common to collect digital information in order to monitor equipment, manufacturing process, as well as the transport of goods, including perishables. In the case of perishable food items, it is often desirable to measure factors such as temperature and humidity which may affect freshness and spoilage. With the proliferation of affordable compact environmental and other sensors, environmental measurements may be performed at multiple locations within a truck cabin, shipping container, or other settings.

Accordingly, systems, methods, and media for processing and representing multivariate sensor information gathered from multiple sources (and potentially also gathered at different times) are desirable.

SUMMARY

In accordance with some embodiments of the disclosed subject matter, systems, methods, and media for systems, methods, and media for transforming a set of component data sequences spanning respective subsets of a first time interval to produce a representative data sequence to represent the set of component data sequences are disclosed In accordance with some embodiments of the disclosed subject matter, a method for transforming a set of component data sequences spanning respective subsets of a first time interval to produce a representative data sequence to represent the set of component data sequence is provided, the method comprising: receiving a plurality of data sequences from respective signal sources; identifying a shortest data sequence of the plurality of data sequences that corresponds to a first interval; calculating, for pairs of data sequences of the plurality of data sequences, a similarity value indicative of a degree of similarity between the pairs of data sequences over the first interval; forming a first segment of a representative data sequence that is a weighted combination of the plurality of data sequences over the first interval wherein each of the plurality of data sequences is weighted based on similarity values associated with that data sequence; truncating at least a subset of data sequences to exclude elements corresponding to the first interval; identifying a shortest data sequence of the subset of data sequences that corresponds to a second interval; calculating, for pairs of data sequences of the subset of data sequences, a similarity value indicative of a degree of similarity between the pairs of data sequences over the second interval; forming a second segment of the representative data sequence that is a weighted combination of the subset of data sequences over the second interval wherein each of the subset of data sequences is weighted based on similarity values associated with that data sequence; and concatenating the first segment of the representative data sequence and the second segment of the representative data sequence.

In some embodiments, the shortest data sequence is associated with a plurality of similarity values, each of the plurality of similarity values indicative of a similarity between the shortest data sequence and one of the plurality of data sequences over the first interval.

In some embodiments, one of the plurality of similarity values is indicative of the degree of similarity between the shortest data sequence and itself over the first interval.

In some embodiments, a weight associated with the shortest data sequence is based on a combination of the plurality of similarity values associated with the shortest data sequence, and the first segment is based on values of the shortest data sequence and the weight associated with the shortest data sequence.

In some embodiments, calculating the set of respective similarity values comprises calculating one or more of: a correlation coefficient; a cosine similarity value; a Euclidean distance value; a Manhattan distance value; a mean absolute error value; a Canberra distance value; and a Jeffries-Matusita distance value.

In some embodiments, each of the plurality of data sequences corresponds to a class of a plurality of classes, and the method further comprises: receiving an unclassified data sequence; comparing the representative data sequence and the unclassified data sequence; and classifying the unclassified data sequence based on the comparison.

In some embodiments, comparing the representative data sequence and the unclassified data sequence comprises: performing a dynamic time warping operation between the representative data sequence and the unclassified data sequence.

In accordance with some embodiments of the disclosed subject matter, a system for transforming a set of data sequences is provided, the system comprising: at least one processor configured to: receive a plurality of data sequences from respective signal sources; identify a shortest data sequence of the plurality of data sequences that corresponds to a first interval; calculate, for pairs of data sequences of the plurality of data sequences, a similarity value indicative of a degree of similarity between the pairs of data sequences over the first interval; form a first segment of a representative data sequence that is a weighted combination of the plurality of data sequences over the first interval wherein each of the plurality of data sequences is weighted based on similarity values associated with that data sequence; truncate at least a subset of data sequences to exclude elements corresponding to the first interval; identify a shortest data sequence of the subset of data sequences that corresponds to a second interval; calculate, for pairs of data sequences of the subset of data sequences, a similarity value indicative of a degree of similarity between the pairs of data sequences over the second interval; form a second segment of the representative data sequence that is a weighted combination of the subset of data sequences over the second interval wherein each of the subset of data sequences is weighted based on similarity values associated with that data sequence; and concatenate the first segment of the representative data sequence and the second segment of the representative data sequence.

In accordance with some embodiments of the disclosed subject matter, a non-transitory computer readable medium containing computer executable instructions that, when executed by a processor, cause the processor to perform a method of transforming a set of data sequences is provided, the method comprising: receiving a plurality of data sequences from respective signal sources; identifying a shortest data sequence of the plurality of data sequences that corresponds to a first interval; calculating, for pairs of data sequences of the plurality of data sequences, a similarity value indicative of a degree of similarity between the pairs of data sequences over the first interval; forming a first segment of a representative data sequence that is a weighted combination of the plurality of data sequences over the first interval wherein each of the plurality of data sequences is weighted based on similarity values associated with that data sequence; truncating at least a subset of data sequences to exclude elements corresponding to the first interval; identifying a shortest data sequence of the subset of data sequences that corresponds to a second interval; calculating, for pairs of data sequences of the subset of data sequences, a similarity value indicative of a degree of similarity between the pairs of data sequences over the second interval; forming a second segment of the representative data sequence that is a weighted combination of the subset of data sequences over the second interval wherein each of the subset of data sequences is weighted based on similarity values associated with that data sequence; and concatenating the first segment of the representative data sequence and the second segment of the representative data sequence.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 8-10 show pseudocode representations of weighting methods suitable for use in certain embodiments.

FIG. 16 shows plots of temperature data sequences from multiple shipments and sensor data sequences (having varying lengths in time), with a representative data sequence generated for each sensor location according to embodiments herein that represents the aggregate behavior of that sensor data sequence across five different shipments.

FIGS. 23 and 24 show examples of classification performance of representative data sequences in accordance with some embodiments of the disclosed subject matter.

DETAILED DESCRIPTION

Figure 1:
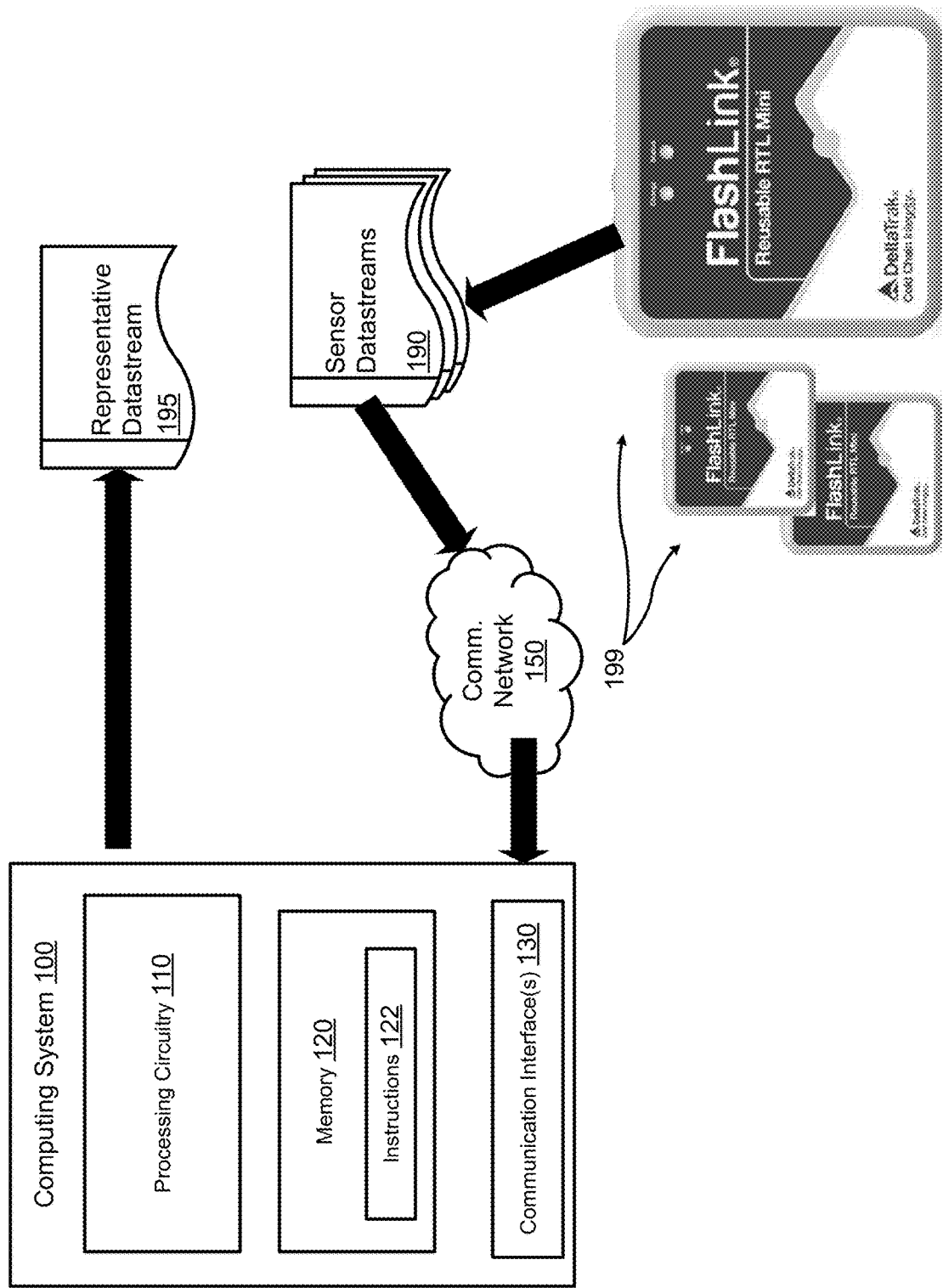
FIG. 1 is a block level schematic of an example environment in which embodiments disclosed herein may be practiced.

Over a half-century, statistical parametric methods provided the state-of-the-art performance for time-series analysis, modeling, and prediction across different applications and fields. For example, Auto-Regressive Moving Average (ARMA), Auto-Regressive Integrated Moving Average (ARIMA), Seasonal ARIMA, exponential smoothing and Vector Autoregression (VAR) models, are parametric methods and generally assume a known prior over the distribution of the time-series data which make them inadequate for many practical applications. The advancement of machine learning has resulted in sophisticated non-parametric methods for time-series modeling and prediction. For instance, Artificial Neural Networks (ANNs) have been successfully applied to time-series applications including modeling and forecasting. Convolutional Neural Networks (CNNs) have successfully been implemented across many domains, including time-series forecasting and classification. Recurrent Neural Networks (RNNs) construct their hidden states "output" by auto-regression of present values using past values. Long short-term memory (LSTM) and Gated Recurrent Unit (GRU), are two advanced variations of RNN to address long-term dependency and vanishing and exploding gradient problems. LSTM has been applied to univariate and multivariate time-series. Bidirectional LSTM (Bi-LSTMs) can integrate information from both past and future time steps by means of two hidden states. Encoder-decoder structures, encoder-decoder based attention, autoregressive recurrent networks, and LSTNet use a combination of CNNs and RNNs.

While the advances in both topology and parametric optimization methods for advanced learning algorithms has led to improvements in performance, the specific way in which the time-series data sequences are processed using such methods and others is represented is critical. Challenges arise when attempting to process and analyze multivariate data using the techniques above and others, particularly when the amount of data that can be gathered or processed is limited by cost constraints or other practical constraints, such as limited computing resources.

One such challenge is synthesizing multiple data sequences into one or more representative data sequences to reduce the amount of information to be processed. For example, it may be difficult to determine whether each of the data sequences are equally reliable or valuable. When this is not the case, simple averaging techniques that assign equal weight to all data sequences may be used, which may have undesirable results. Additionally, sensor data may contain dropouts due to technical problems which may include, for example, dead batteries and other failures. But many conventional techniques for combining multiple time series data sequences require that each data sequence is of the same length and contain measurements for the same interval. The analysis and processing of multivariate and heterogeneous time-series data for predictive tasks represent a particular challenge, especially when data sequences may have variable lengths. Approaches for how collected time-series data is represented to machine learning systems (such as approaches described herein), particularly when recording times are not uniform, may improve performance of the machine learning systems by improving the quality of data provided to the machine learning systems.

Different conventional approaches have specific pitfalls. Zero padding is often an inappropriate approach for time-series data when the value 0 may represent an important value such as 0° C. (e.g., for data related to food transportation). Another approach is cropping, in which all the time-series signals are clipped to be the same length as the shortest time series sequence. This approach may lead to significant loss of information, especially for multivariate time-series with large variable lengths. For example, if one or more time series are discontinuous, the cropped lengths of those time series may be extremely short when compared to their original lengths. Discarding large amounts of information, as may result from cropping may lead to underfitting if the cropped data are subsequently fitted to a curve or other function.

Manifestations of these practical challenges can be seen in different industries, particularly for the applications of sensor networks in monitoring production and distribution of goods around the globe. Examples can be found in the temperature-controlled transportation of goods where sensors can be placed in different locations along the supply chain and data can come from different shipments with different numbers of observations across time. Mechanisms disclosed herein (sometimes referred to as "Sense2Vec") may be used to process variable-length sensory time-series data leveraging various similarity metrics between different time-series temperature data sequences. Methods disclosed herein are shown to be robust to the use of different distance similarity measures (such as dynamic time warping or Pearson's correlation coefficient, as non-limiting examples) and may improve visualization and summarization of the multivariate raw time-series through representations that are robust to noise and outliers. Specifically, a moving clipping mechanism may be used to create uniform sets of disjoint sensory recordings across multiple groups to calculate normalized similarity distances followed by a weighted fusion and concatenation to create a representative vector for each sensor group.

In accordance with various embodiments, mechanisms (which may, for example, include systems, methods, and media) for combining multiple time series data sequences into one or more representative data sequences are provided. These mechanisms allow data sequences of disparate length to be automatically combined (e.g., without user intervention) into a single representative data sequence in which the individual contributions are weighted to reduce the impact of data sequences which may be less representative of the aggregate than others. Noise and other outliers may be mitigated with a weighted averaging operation. Among advantages of embodiments disclosed herein are the ability to analyze time-series data with any length in duration including any number of variables, and the ability to represent data in a compact, memory efficient representation by compressing high-volume data into smaller vectorial representations.

It should be understood that embodiments herein are capable of processing data sequences other than time series data and that nothing herein, including the description of various processes below is intended to limit embodiments to processing time-series data. For example, suitable signals may include spatial data. For example, a component data sequence may include information describing a length of an object (or other characteristic) with respect to an independent variable representing a spatial dimension. Multiple component data sequences having different extents along the spatial dimension may be combined into a representative signal describing the object based on multiple observations. Nor must the component signals be two dimensional. As one example, a component data sequence might describe dimensions of an object along two spatial axes as function of position along a third spatial axis and a representative data sequence describing the most likely shape of the overall object may be generated by combining component data sequences as described herein.

It should also be understood that the systems and methods herein are also suitable for use with discrete-time data sequences that are sampled using disparate sampling intervals. In some embodiments, one or more data sequences may be upsampled, downsampled, or interpolated as needed to produce a set of input data sequences that each have the same sampling interval.

Methods disclosed herein have been tested on a novel food transportation dataset which includes temperature recordings from wireless sensor networks implemented on different shipments of perishable commodities across the United States. Accordingly, many of the descriptions below refer to temperature data sequences. However, it will be appreciated that the methods disclosed herein may be applied to other suitable data sequences and that these methods may have additional benefits and advantages for particular applications. As one non-limiting example, methods disclosed herein may be applied to biological information such as data-sequences representing electroencephalography (EEG) measurements or electrocardiogram (ECG) measurements, as non-limiting examples.

In some applications, data sequences may include inherently sensitive information or may be associated with sensitive information such as protected health information of patients, as one example. In such applications features of methods disclosed herein can provide additional benefits. Specifically, methods disclosed herein for producing a representative data sequence may be used to combine several sensitive data sequences into a representative sequence in which the original component data sequences can no longer be distinguished from each other or otherwise identified. Accordingly, methods disclosed herein may be used to aggregate and anonymize information from sensitive data sequences to reduce or eliminate the risk of disclosure or de-anonymization of sensitive information.

FIG. 1 illustrates an example environment in which embodiments may be practiced. A computing system 100 includes processing circuitry 110, memory 120 coupled to the processing circuitry, and at least one communication interface 130 coupled to the processing circuitry 110. The memory 120 stores machine-readable instructions 122 which, when executed by the processing circuitry 110, are configured to cause the computing system 100 to perform methods disclosed herein. The computing system 100 receives multiple sensor data sequences 190 from sensors 199 and transforms the data sequences 190 into a single data sequence 195 that is representative of all the data sequences 190. The sensor data sequences 190 may be received via a communication network 150 as shown in FIG. 1 or in any other suitable fashion. Similarly, the representative data sequence may be transmitted to one or more computing systems via the communication network 150 or in any other suitable fashion. The computing system 100 may utilize the representative data sequence 199 to perform various analyses, including predictive modeling using machine learning and other algorithms. It will be appreciated that substituting the representative data sequence 195 for the multiple sensor data sequences 190 when performing various computing tasks may confer certain advantages including reduced utilization of memory and other computing resources. It will also be appreciated that data sequences produced using systems and methods disclosed herein (such as representative data sequence 195) may be used as input to various machine learning and other data analysis systems in order to improve the accuracy and other performance characteristics of these systems.

It will be appreciated that FIG. 1 shows a non-limiting example of a system suitable for performing methods disclosed herein. Other non-limiting examples may include any suitable combination of hardware, firmware, or software. For instance, some or all functions may be performed by one or more application-specific integrated circuits (ASICs) and/or one or more field-programmable gate arrays (FPGAs). Furthermore, it will be understood that various components and functionality of suitable systems may be distributed between multiple distinct computing systems, including, but not limited to, any suitable combination of client and server systems and physical and virtual machines, which may communicate over one or more communication networks, including, but not limited to, private networks, public networks such as the Internet, virtual private networks, wireless communication networks, optical communication networks, electrical communication networks, and the like.

Figure 2:
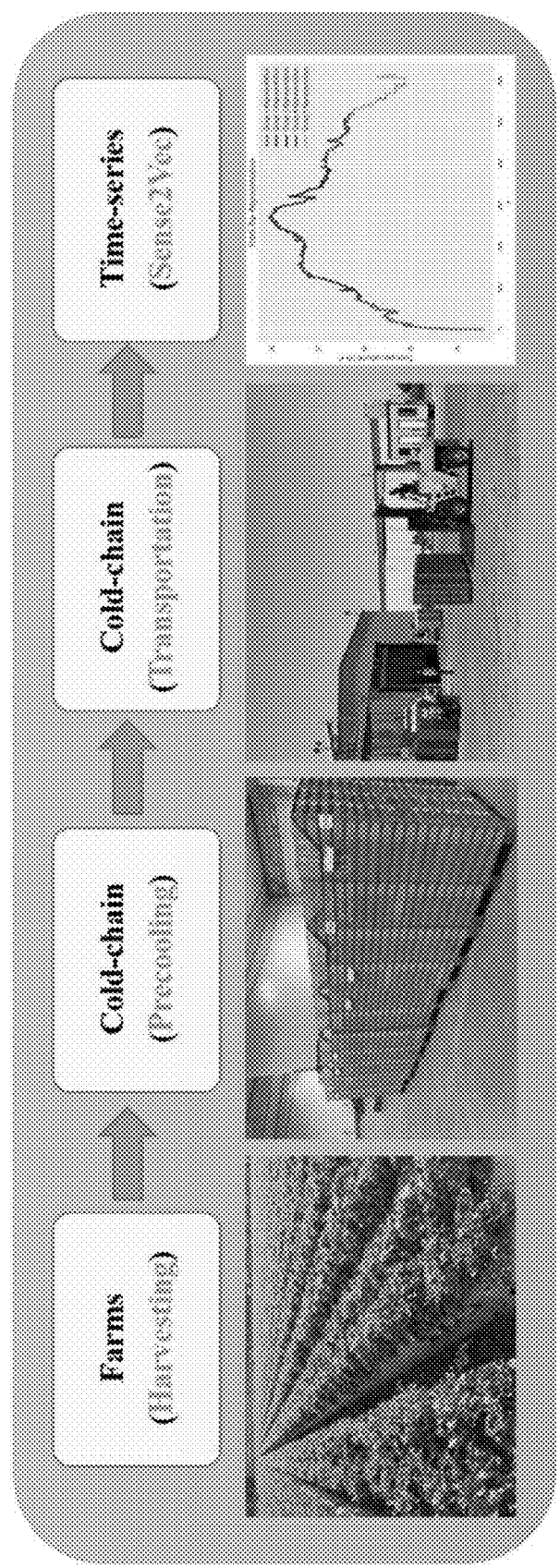
FIG. 2 is a schematic diagram illustrating an example application of embodiments disclosed herein.

FIG. 2 illustrates different phases in the transportation of produce and a resulting temperature data sequence. Produce is harvested, then transferred to a refrigerated distribution location. From there, the produce is transported via refrigerated truck to its final destination.

Figure 3:
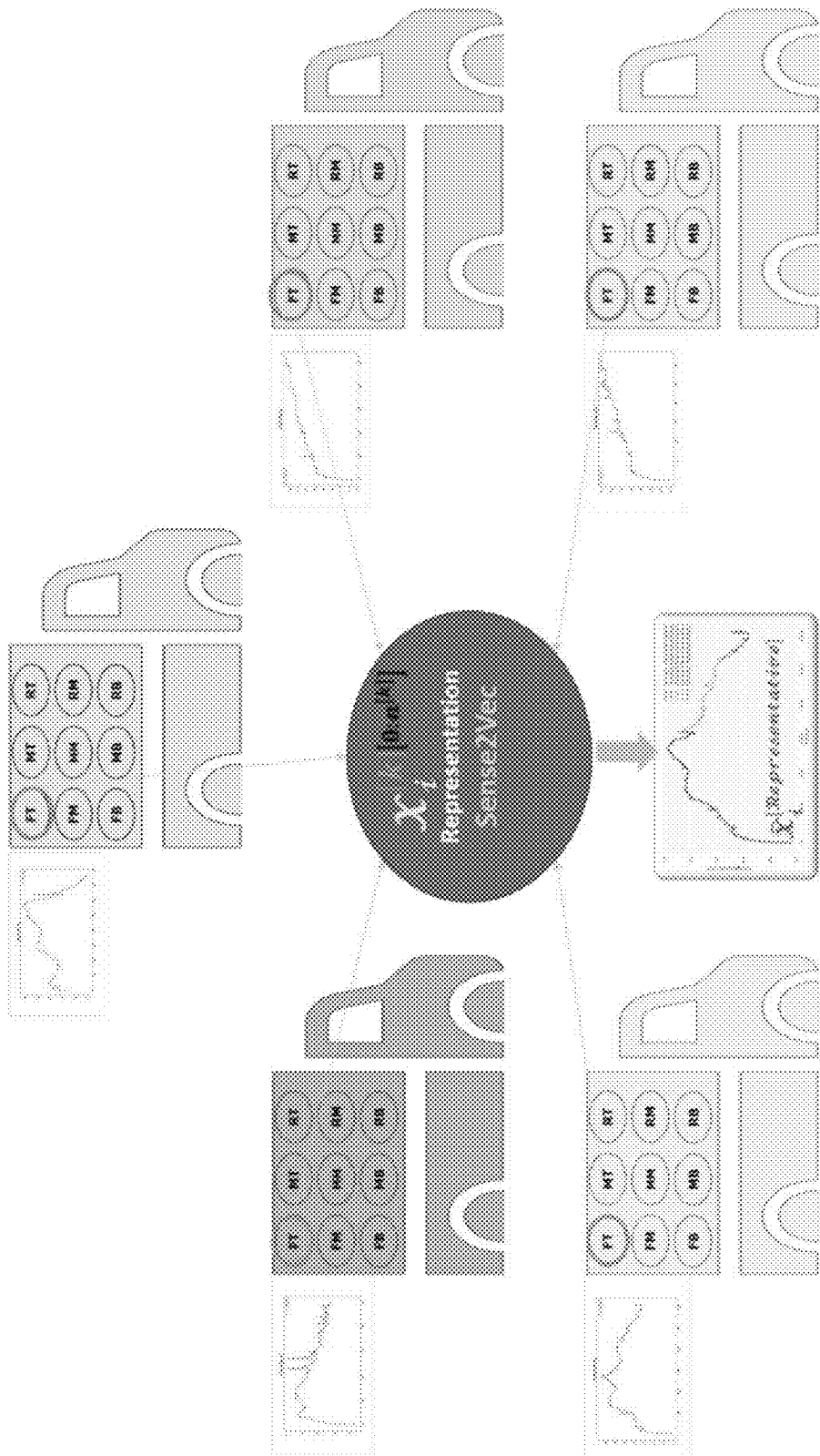
FIG. 3 is a schematic illustration of time series temperature data collection and generation of a single representative data sequence according to embodiments herein.

Systems and methods disclosed herein are illustrated using results of an example study conducted in which a novel temporally complex, and location aware multivariate time series dataset was used. This dataset represents the temperature variations across 5 different shipments of perishable produce via truck in shipping containers, with 9 sensors in each shipment monitoring and recording sensory data at 15-minute intervals across multiple days. This arrangement is illustrated by FIG. 3 showing diagrams of five truck shipments. Each shipment is equipped with 9 sensors, identified by their locations within the trucks. In the schematic example shown, the sensor data sequences for each of the front-top (FT) sensors, each potentially covering a different length of time are collected and combined into a single representative data sequence having the same length in time as the longest data sequence. Sensor data sequences such as those described may have different lengths for any number of reasons, examples of which include power losses (e.g., dead batteries), communications failures, component failures, or differences in configuration (e.g., different sensors may be configured intentionally or unintentionally to log data at different rates). Additionally, different processes (e.g., different shipments) may be associated with different durations, and thus the total length of time in a data sequence may be longer if the process being measured lasted longer.

In the example of FIG. 3, each shipping container had three instrumented pallets which were placed in the front, middle and back of the container where each pallet had a temperature sensor placed near the top, middle and the bottom of the pallet for a total of nine sensors in each shipment. Hence, each of the 9 loggers in an instrumented shipment are labeled with respect to the loggers' respective locations in the pallet and the pallet's location in the shipping container (front-top, front-middle, front-bottom, middle top, . . . , rear-bottom). Two of the five shipments originated from Plant City, Florida with final destinations in Florida and Georgia. The three remaining shipments originated from Salinas, California with final destinations in a wide range of states including Maryland, Pennsylvania, Virginia, South Carolina, North Carolina, Georgia, and Texas. To collect the data, the loggers were implements using Reusable Real-Time-Logger (RTL) Mini sensor devices available from DeltaTrak, Inc. The loggers were used to log both temperature and location data in real time. The data was transmitted in real time via GSM cellular networks which eliminated the need to collect the loggers at the end of the shipment to access the recorded data. The loggers have a wide temperature range of −22° F. to 140° F. with a temperature accuracy of +/−1° F. in the range of interest. The temperature time-series data sequences from the five shipments during the interval from precooling to the end of transportation are shown for each shipment. These temperature time series data sequences for each shipment are single data sequences synthesized from each of the nine individual sensor data sequences for that shipment using methods disclosed herein. These five shipment-level data sequences were used to generate a single time series data sequence representation of the time-dependent temperatures experienced by a shipment.

Table I below shows the Length of temperature time-series data sequences for all sensors and across all the shipments in this example. Notably, the number of measurements (i.e., the time extent) for the sensors located within a given shipment vary widely, as do the lengths of the longest time-series of each shipment.

TABLE I

| Sensor Position | Shipment 1 | Shipment 2 | Shipment 3 | Shipment 4 | Shipment 5 |
|---|---|---|---|---|---|
| Front-Top | 100 | 1094 | 2019 | 925 | 1995 |
| Front-Middle | 2054 | 952 | 2027 | 1882 | 2054 |
| Front-Bottom | 2054 | 1490 | 922 | 1276 | 54 |
| Middle-Top | 1320 | 1952 | 811 | 1036 | 1003 |
| Middle-Middle | 100 | 1960 | 1316 | 1145 | 605 |
| Middle-Bottom | 2054 | 844 | 916 | 1012 | 781 |
| Rear-Top | 1008 | 1666 | 2049 | 1041 | 995 |
| Rear-Middle | 827 | 1999 | 1287 | 1047 | 974 |
| Rear-Bottom | 1105 | 1173 | 930 | 1885 | 1721 |

In an example, a time series t of size n is defined as a collection of data points measured sequentially over equally spaced time intervals, denoted by the expression $t=(x_1, x_2, \ldots, x_n)$, where $x_t$ is an observation at time t. Such time series signals can be classified into two main groups: deterministic, if there is a mathematical function $f$ mapping the time series values to y; and stochastic if a random error occurs within the time series signal in addition to the mathematical function, $f$. Generally a time series t is generated from an underlying stochastic process via a probability rule that governs the joint distribution of the random variables that generate that process. A time series can be univariate if observations in the time series are recorded over a single variable, and multivariate otherwise. Time series can be represented by graphs where the observations are plotted against the times of such observations. In total, the collected dataset includes 45 time series (9 sensor data sequences for each of five shipments) with a varying number of observations due to the different lengths of the shipments and the sensor start/stop times.

Figure 4:
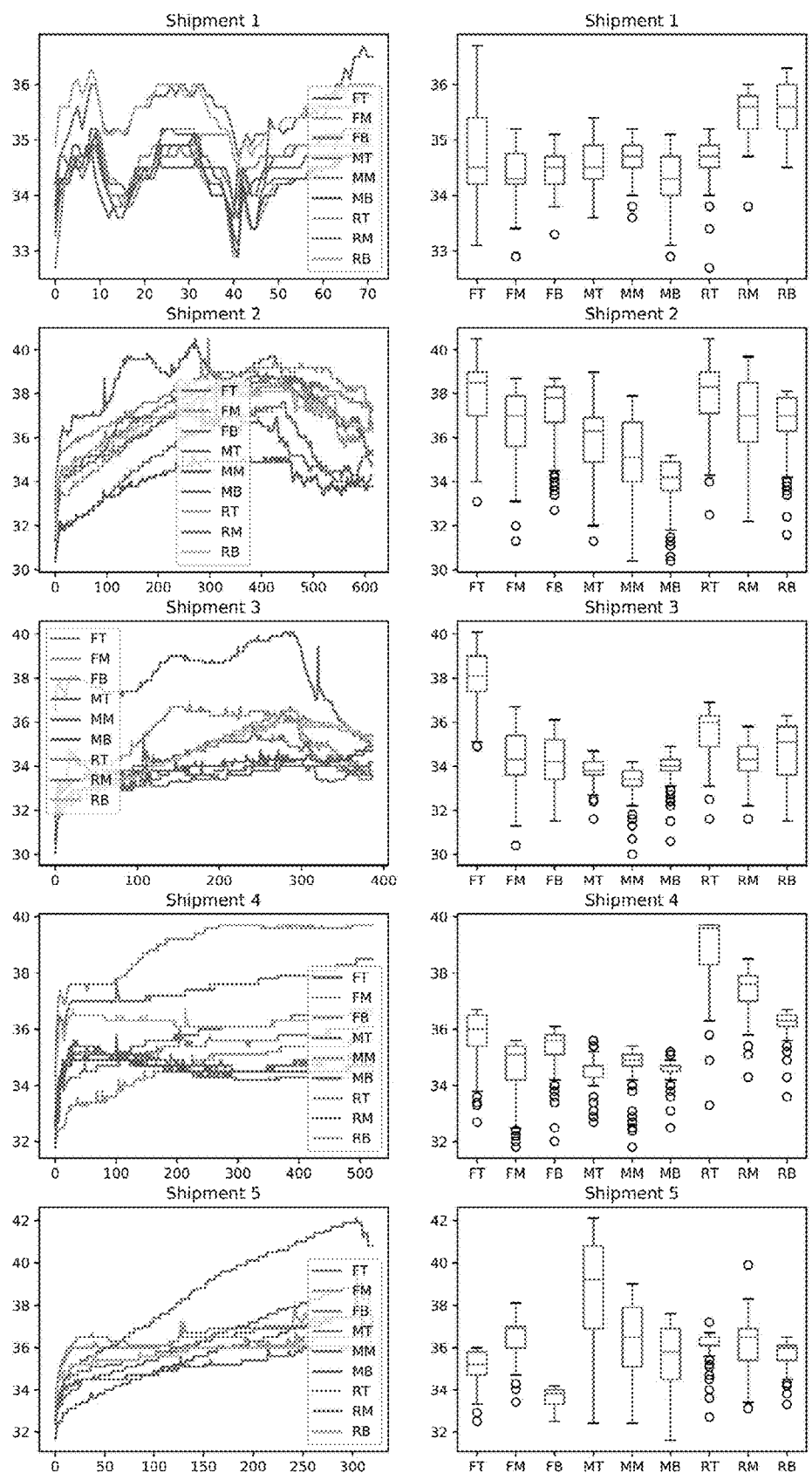
FIG. 4 shows time series temperature sensor data from multiple sensors collected during five shipments of perishable produce.
Figure 5:
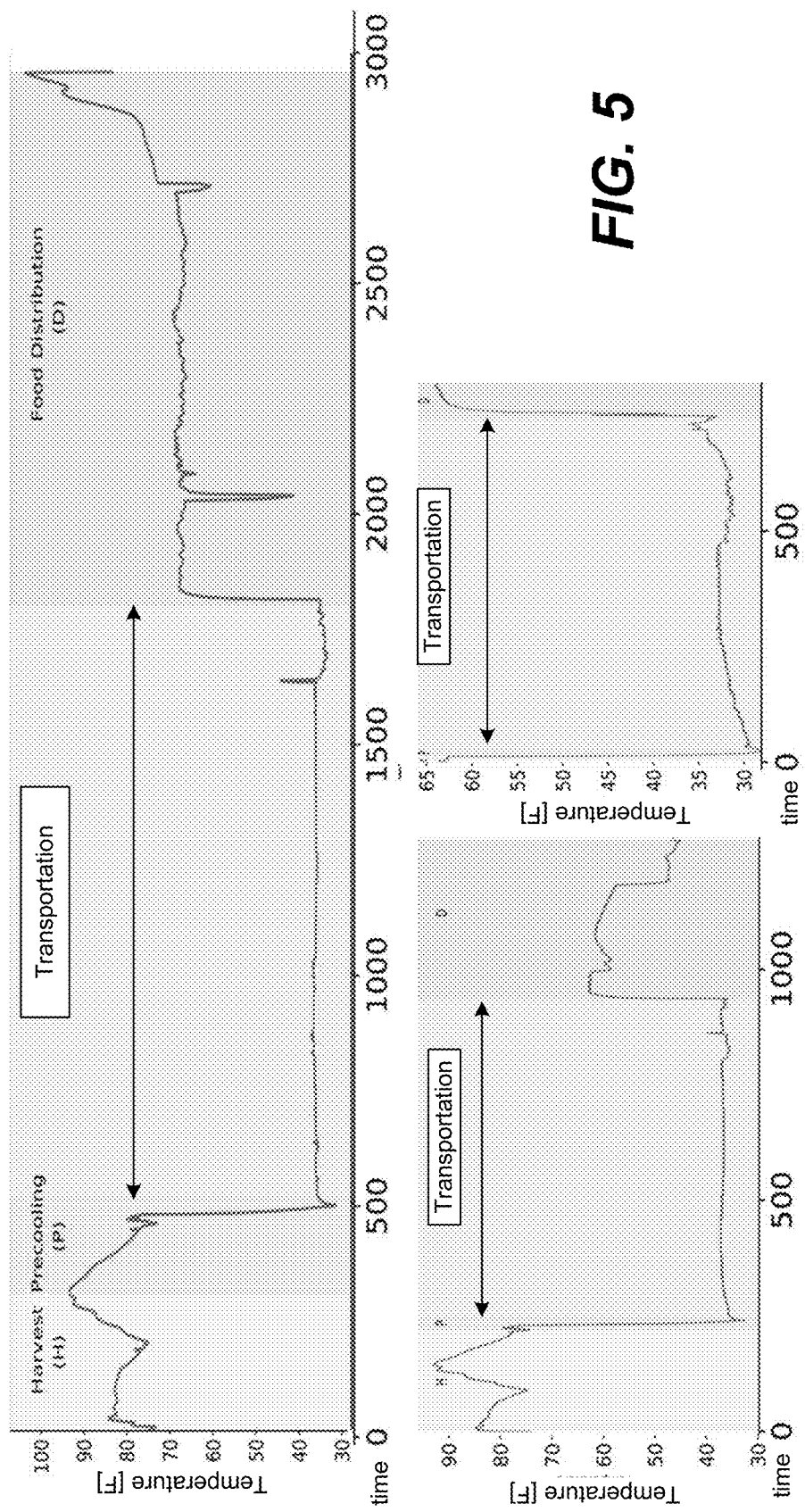
FIG. 5 shows three example plots of time series temperature data for three different produce shipments.

FIG. 4 shows each sensor temperature data sequence separately for each of the 5 shipments where first-column of the figure shows the shipments. FIG. 4 also shows simple statistical distributions for each time series in the box plots for the nine sensors in each shipment in the second column. The black dots in each row of the figure represent the outliers for that particular distribution. Traditionally, in a strawberry cold chain beginning at the field, strawberries are harvested and placed into plastic clam shells (the packaging consumers may be most familiar with) which are subsequently stacked together to build strawberry pallets. Once the pallets are built in the field on the back of a flatbed trailer, they are driven to the nearest processing facility to be precooled down to transportation and storage temperatures (e.g., 32° F.). This represents the most critical period in the proper temperature management regimen of strawberries, as even a single hour delay in precooling can result in days of shelf life loss which are not readily observable until the product is placed on the grocery display for sale. After the precooling is completed, the pallets are generally either i) shipped directly to the distribution centers (DC) or ii) stored at the processing facility. While the ideal transportation and storage temperatures are identical (32° F.), more variations in the data sequences are observed for transported pallets due to opening and closing of the loading doors during the loading/unloading stages as shown in FIG. 5 which shows three shipments having different lengths of time for each of the various steps. If these data sequences are used to analyze field precooling transport temperature, portions of the data sequences corresponding to different phases (e.g., the distribution phase) can be disregarded. Data corresponding to other phases can be identified by the collective divergence of logged temperatures in the same shipment at or near a single point in time for a specific shipment.

Figure 6:
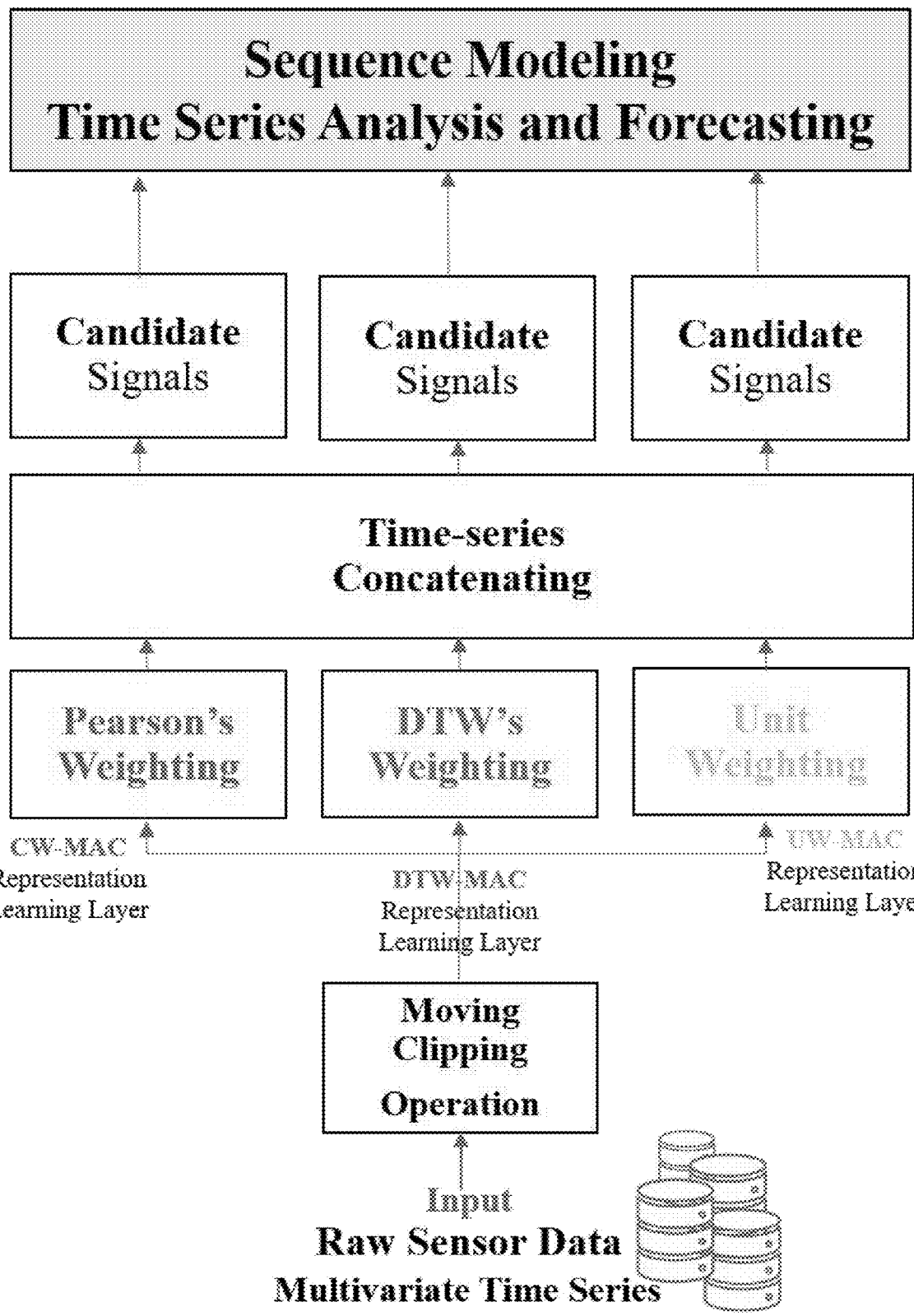
FIG. 6 is a block level flow diagram illustrating methods disclosed herein.

FIG. 6 is a schematic level flow diagram of processes of gathering and transforming sensor data sequences according to embodiments disclosed herein for use in additional analysis and forecasting. Raw sensor data streams are collected (e.g., data sequences such as those shown in FIGS. 4-5). Generally, the time series data will be labeled with timestamps or other indices which are aligned with each other (for example, the data may have been collected on different days and/or different times of day). The data sequences are registered to each other (for instance, each data sequence shown in FIG. 5 may be time indexed such that the beginning of the transportation phase is defined as t=0). Data sequences that represent multiple component data sequences, which may have different lengths, are generated by clipping the component data sequences into overlapping groups for different intervals and then weighting the clipped data sequences, as described in detail below. Various weighting techniques including correlation based techniques (correlation weighting using Pearson correlation scores), dynamic time-warping, and unit-weighting (moving averages may be used). The representative data sequence segments are then concatenated to generate signals having uniform lengths of the length of the longest input signals. Each of these signals (generated using different weightings for example) may be used in subsequent analyses. For example, multiple candidate signals may be evaluated by a machine learning system to determine which has the best predictive value for a given application.

For further illustration, a collection of multivariate time-series sensor data is denoted by $X_i^j$, where subscript i indicates the sensor ID (i.e., location) and superscript j indicates the shipment number for that sensor (i.e., first, second, etc.). For instance, in the specific scenario described above where 9 sensors were placed in five different shipments, $X_1^3$ denotes the temperature vector collected for the third shipment from the first sensor location. Please note that the temperature vectors may all be different sizes and the systems and methods disclosed herein are tailored to account for such a condition.

Assuming m sensor locations and k shipments, The time-series signals are first placed in ascending order of length $X_i$ for i=1, 2, 3, ... m with superscripts 1 and k for the shortest and longest signals in time, respectively, $X_i^{[1]}$; $X_i^{[2]}$; $X_i^{[3]}$; ... $X_i^{[k]}$. In the examples herein each shipment has nine sensors: for front-top (FT), front-middle (FM), front-bottom (FB), middle-top (MT), middle-middle (MM), middle-bottom (MB), rear-top (RT), rear-middle (RM) and rear-bottom (RB) respectively where the first word describes the location of the sensor-instrumented pallet in the container (front, middle or rear) and the second word describes the location of the sensor in the pallet itself (top, middle or bottom).

Next, k temporal similarity matrices are computed starting by truncating the length of all k−1 signals to have the same length as the shortest signal. Then, a (k×k) similarity matrix is computed. For illustration, an embodiment in which the similarity matrices are Pearson correlation matrices is described. However, as disclosed herein, any suitable similarity metric may be used.

Next, all signals (excluding the shortest signal) are truncated to have the same size as the second shortest signal in the group and a corresponding (k−1)×(k−1) similarity matrix is computed. The process continues until only the longest signal remains (e.g., which can be represented by a 1×1 similarity matrix with a value of 1). An example of the k similarity matrices is shown below, where $\sigma_{ij}$ represents the Pearson's correlation coefficient between signals i and j:

$$\begin{bmatrix} \sigma_{11} & \sigma_{12} & \cdots & & \sigma_{1k} \\ \sigma_{21} & \sigma_{22} & \ddots & & \vdots \\ \sigma_{31} & \ddots & \ddots & & \sigma_{3k} \\ \vdots & \ddots & \sigma_{(k-1)(k-1)} & \sigma_{(k-1)k} \\ \sigma_{k1} & \cdots & & \sigma_{k(k-1)} & \sigma_{kk} \end{bmatrix} ; \begin{bmatrix} \sigma_{11} & \cdots & \sigma_{1(k-1)} \\ \sigma_{21} & \ddots & \vdots \\ \vdots & \ddots & \vdots \\ \sigma_{(k-1)1} & \cdots & \sigma_{k-1} \end{bmatrix} ; \quad [1]$$

$$\begin{bmatrix} \sigma_{11} & \cdots & \sigma_{1(k-2)} \\ \vdots & \ddots & \vdots \\ \sigma_{(k-2)1} & \cdots & \sigma_{(k-2)(k-2)} \end{bmatrix} ; \ldots ;$$

Pearson's product-moment correlation coefficients can be written as:

$$\sigma_{xy} = \frac{\sum_{i=1}^{n^{[0]}} (x_i - \overline{x_i})(y_i - \overline{y_i})}{\sqrt{\sum_{i=1}^{n^{[0]}} (x_i - \overline{x_i})^2} \sqrt{\sum_{i=0}^{n^{[0]}} (y_i - \overline{y_i})^2}}$$

where $n^{[0]}$ is the length of the shortest signal in the group for the first correlation matrix which includes all k signals. It is calculated similarly for the subsequent correlation matrices with (k−1) signals where $\overline{x}_i$ is the average mean of the ordered time-series signals of length $n^{[0]}$:

$$\overline{\overline{x}}_i = \frac{1}{n^{[0]}} \sum_{i=1}^{n^{[0]}} (x_i)$$

A suitable similarity metric (such as Pearson's correlation above) quantifies how similar or different each data sequence in a group is to other data sequences in that group (e.g., how similar or different the temperature data sequences from sensor locations inside different shipments or shipping-containers are from each other). Pearson's correlation coefficient provides one robust way to summarily visualize the temporal similarities that can exist. For example, a high correlation coefficient between two different locations may indicate that a single sensor could be sufficient to represent both temperature recordings whereas low correlation coefficients across the board may For each Pearson's correlation matrix, normalized weight coefficients for each signal can be computed as follows:

$$W_i^{[p]} = \frac{\sum_{j=1}^{k} \sigma_{pj} - 1}{\left( \sum_{i=1}^{k} \left( \sum_{j=1}^{k} \sigma_{ij} - 1 \right) \right)}$$

Normalized weight coefficients are used to construct a similarity-based representative signal for that sensor location by capturing the underlying distributions for each group while preserving the temporal nature of signals. The first group of time series signals can be combined as follows:

$$\hat{X}_{group_1}^{[1]} = W_k^{[1]} \cdot \chi_i^{[1][0:n^{[0]}]} + W_k^{[2]} \cdot \chi_i^{[2][0:n^{[0]}]} + \ldots W_k^{[k]} \cdot \chi_i^{[k][0:n^{[0]}]}$$

$$\hat{X}_{group_2}^{[2]} =$$
$$W_{k-1}^{[2]} \cdot \chi_i^{[2][n^{[0]}:n^{[1]}]} + W_{k-1}^{[3]} \cdot \chi_i^{[3][n^{[0]}:n^{[1]}]} + \ldots W_{k-1}^{[k]} \cdot \chi_i^{[k][n^{[0]}:n^{[1]}]}$$

$$\hat{X}_{group_3}^{[3]} = W_{k-2}^{[3]} \cdot \chi_i^{[3][n^{[2]}:n^{[3]}]} +$$
$$W_{k-2}^{[4]} \cdot \chi_i^{[4][n^{[2]}:n^{[3]}]} + \ldots W_{k-2}^{[k]} \cdot \chi_i^{[k][n^{[2]}:n^{[3]}]}$$

$$\vdots = \vdots$$

$$\hat{X}_{group_k}^{[k]} = W_1^{[k]} \cdot \chi_i^{[k]n^{[k-1:k]}}$$

where p=1, 2, . . . k represent the normalized weight coefficient for the first, second, . . . $m^{th}$ time series signals, respectively. Note that the sum of normalized weight coefficients for each matrix is equal to one.

Recall that $W_i^{[k]}=1$ and $X_i^{[k]n^{[k-1:k]}}$ denotes the remaining records of the longest time-series signal. The final compound signals for the first group can be obtained by vertically concatenating all $\hat{X}_{group_j}^{[i]}$ to form one time series signal that best represents all the individual time series signals, $\hat{X}_i^{[Rep]} = [\hat{X}_{group_1}^{[1]}, \hat{X}_{group_2}^{[2]}, \hat{X}_{group_3}^{[3]}, \ldots, \hat{X}_{group_k}^{[k]}]$. Observe that $\hat{X}_i^{[Rep]}$ will have the same length as the longest time series signal in the group to be represented by a single signal.

This approach is based upon the temporal correlations of each temperature data sequence to identify which temperature data sequences have more influence in generating the representative temperature data sequence. Weightings using correlation a correlation metric is sometimes referred to herein as correlation-weighted moving average coefficient (CW-MAC) weighting methods.

A second variation is referred to herein as a dynamic time warping (DTW) moving average coefficient (DTW-MAC) weighting method and can be achieved by computing the normalized weights for each group using the dynamic time warping distance metric below as a measure of comparing one time-series data sequence to another. DTW has been successfully implemented across different application domains. DTW measures similarity between two time-series sequences of temporal and phase misalignments and with different lengths and allows sequences to be expanded or compressed along the time axis. Mainly, DTW warps the time axis of one (or both) temperature data sequence sequences to achieve a better alignment. To align two sequences, DTW constructs an ($n_x \times n_y$) matrix where the (i,j) element of the matrix contains the distance $d(x_i, y_j)$ between the two temperature points $x_i$ and $y_j$ (typically the Euclidean distance). Each matrix element (i,j) corresponds to the alignment between the temperature points $x_i$ and $y_j$.

DTW warping path is subject to three constraints: boundary conditions, continuity and monotonicity; to minimize the overall warping cost, it can be written as follows:

$$DTW(x, y) = \min\left\{ \frac{\sqrt{\sum_{i=1}^{L} z_i}}{L} \right\}$$

where L is used to compensate for warping paths that may have different lengths. In order to find the minimum path, the warping path Z is contiguous:

$$Z = z_1, z_2, \ldots, z_L$$

$$\max(n_x, n_y) \leq L < (n_x + n_y - 1).$$

DTW uses dynamic programming to compute the cumulative distance $\zeta(i,j)$ from $d(i,j)$ "current position" in the matrix and the minimum of the cumulative distances of the adjacent elements:

$$\zeta(i,j) = d(xi, yj) + \min\{\zeta(i-1,-1) + \zeta(i-1,j) + \ldots \zeta(i,j-1)\}.$$

Here $\zeta(i,j)$ is computed for each pair of data sequences in each group and then normalized to produce new normalized weights $W_i^{[p]}$ in the equations above A third variation involves setting each correlation based weight to be the same (unit value) where each shipment is assumed to have the same impact on the representative data sequence. This variation is referred to herein as unity-weighted moving average coefficient weighting (UW-MAC) and is included as a baseline comparison in the analysis to follow. Additionally, representation techniques disclosed herein can help aggregate similar shipments to reduce the redundancy of selecting similar time-series data sequences for representation which would ultimately reduce the time and memory complexity of the time-series analysis.

Representative data sequences generating using CW-MAC weighting were compared to representative data sequences generated using DTW-MAC weighting to quantify the agreement between related time-series data sequences in general, and more specifically within each group. Small DTW values indicate stronger temporal alignment or greater similarity between sensors and represent a good illustration of the agreement of strawberry temperature measurements among different sensors inside shipping containers. Conversely, large DTW values indicate higher levels of misalignment in terms of the data sequence behavior. The differences in DTW distance distributions computed due the experimentation phase, such as the averages (e.g., mean), standard deviations, and the skewness directions can jointly be interpreted as challenging indicators for the temporal heterogeneity, complexity, similarity, and discrepancy of the collected multivariate time-series. These distance-based distributions can be helpful in location-based predictions for wireless sensor networks and data analytics applications as the selection, identification, and grouping of the best candidates are useful preprocessing steps for increasing the accuracy of time-series forecasting, clustering, and classification applications. An example of generating a final representation (combined vector) from a set of component time-series data sequences is described below in connection with FIG. 7.

Figure 7:
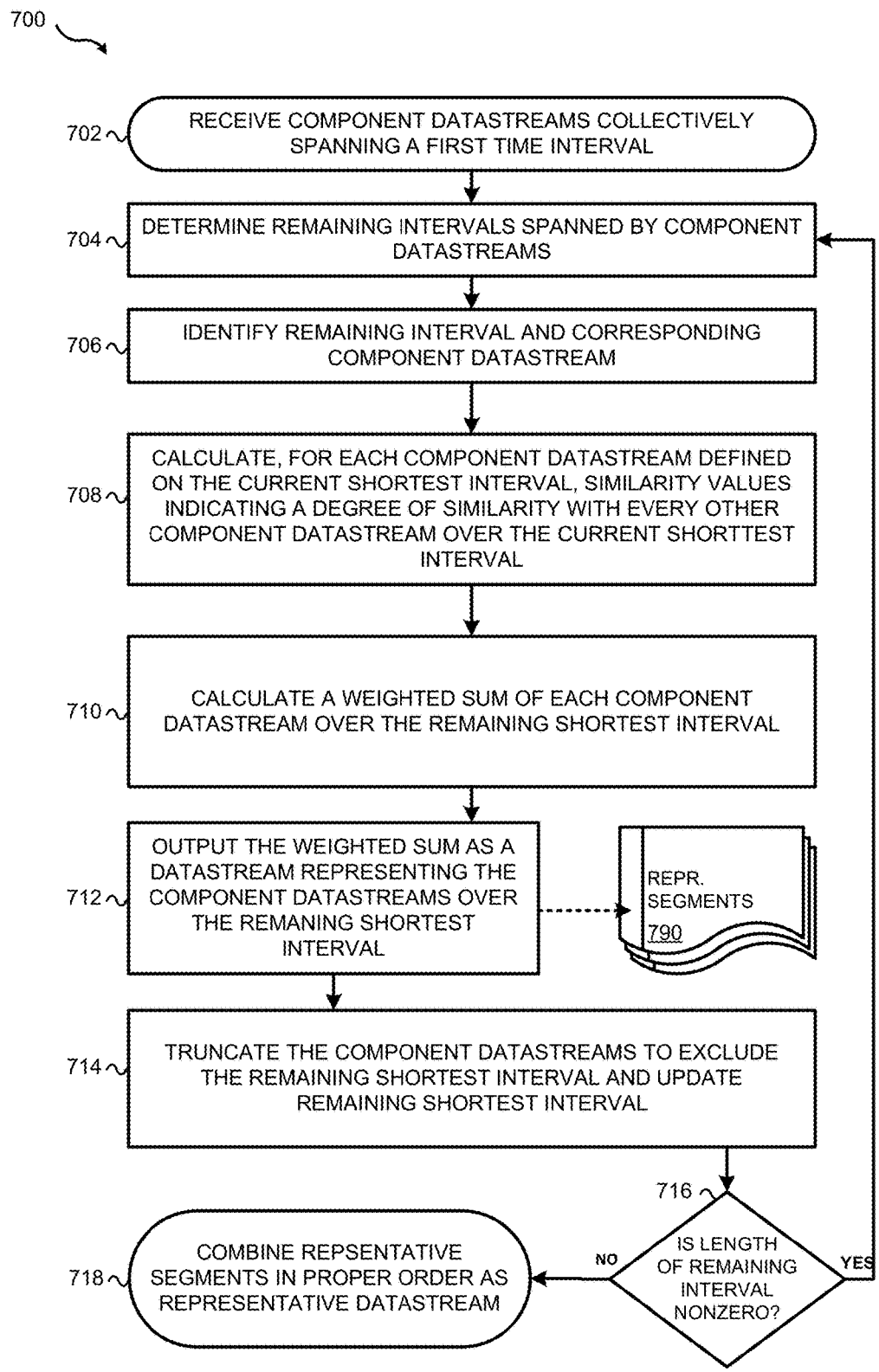
FIG. 7 is a flow diagram illustrating steps of an example process according to embodiments herein.

FIG. 7 illustrates a non-limiting example process 700 according to embodiments herein. The process 700 can be performed by a system such the computing system 100 of FIG. 1. At 702, the process 700 receives component data sequences collectively spanning a first time interval (e.g., the sensor data sequences 190 of FIG. 1). In some embodiments, process 700 may register the data sequences to each other using a common reference point (or reference points). For example, as described above in connection with FIG. 5, process 700 may index each data sequence such that the beginning of the transportation phase is defined as t=0). In some embodiments, different portions of a data sequence (e.g., corresponding to different parts of a cold chain) may be analyzed separately. For example, a transportation phase may be analyzed using process 700, and a pre-cooling phase may be analyzed separately using process 700 (e.g., resulting in a representative data sequence that represents the transportation phase, and another representative data sequence that represents the pre-cooling phase). In such an example, multiple representative data sequences that represent different portions of a process may be concatenated to generate a representative data sequence that represents multiple portions of the process (e.g., a transportation phase representative data sequence may be concatenated with a pre-cooling representative data sequence).

At 704, the process 700 determines the time intervals spanned by each of the component data sequences and at 706, the system identifies a remaining shortest interval represented in each data sequence (e.g., a length of the shortest remaining data sequence) and the corresponding component data sequence that spans that interval.

At 708, the process 700 calculates, for each component data sequence defined on the remaining shortest interval, similarity values indicating a degree of similarity with every other component data sequence over the remaining shortest interval. Any suitable method of computing the similarity values may be used. For example, the similarity values for a component data sequence may be Pearson correlation coefficient with respect to each other data sequence, DTW similarity metrics with respect to each other data sequence, computed over the remaining shortest interval identified at 706. Alternatively, unity weighting may also be used in some embodiments.

At 710, the process 700 calculates a weighted sum of each component data sequence over the remaining shortest interval. Any suitable weighting method may be used. In some embodiments, the weighting applied to each component data sequence is proportional to the sum of the similarity values for that component data sequence. In some such embodiments, the weighting of each component data sequence is the sum of the correlation coefficients of that component data sequence with each of the other component data sequences. FIGS. 8-10 are pseudocode descriptions of example processes related to the process 700 using different suitable weighting methods.

At 712, the process 700 outputs the weighted sum as a data sequence representing the component data sequences over the remaining shortest interval, and this output is saved as a representative data sequence segment 790.

At 714, the process 700 truncates the component data sequences to exclude the remaining shortest interval. The process 700 then updates the remaining shortest interval based on the shortest data sequence. In some embodiments, a computing system performing the process may truncate the component data sequences by storing copies of the data sequences excluding the remaining shortest interval in memory (e.g., the memory 120 of FIG. 1) of the system. In some embodiments, a system performing the process may (re)define a variable, pointer, or other construct in memory of the system such that the system operates on the component data sequences as though the component data sequences no longer span the remaining shortest interval. At 716, the process 700 determines whether the remaining shortest interval is of non-zero length. If so, the process 700 returns to 704 and determines the intervals spanned by the (now truncated) component data sequences and then continues to perform steps 706-716. If the remaining shortest interval is zero, the process 700 proceeds to 718, the system concatenates the presentative segments 790 in proper order as the single representative data sequence for all the component data sequences (e.g., the representative data sequence 195 of FIG. 1).

In embodiments in which the process 700 or similar processes are carried out by a computing system such as the computing system 100, the process 700 and similar processes may be implemented or described recursively as part of program code forming executable instructions (e.g., the instructions 122 of FIG. 1). It should be understood that any such implementation or description may be used, including iterative descriptions.

A detailed example of a process to obtain a final representation (e.g., the representative data sequence 195 of FIG. 1) from an input related time-series data sequences (e.g., the sensor data sequences 190 of FIG. 1) according to embodiments herein is now described. First, the process receives, as inputs, the data sequences {ship1, ship2, ship3, ship4, ship5}, having with lengths equal to {72, 615, 387, 521, 321}, respectively. The process obtains each time-series data sequence is obtained by taking the portion of the sensor recording from the end of the precooling to the arrival at DC.

Figure 12:
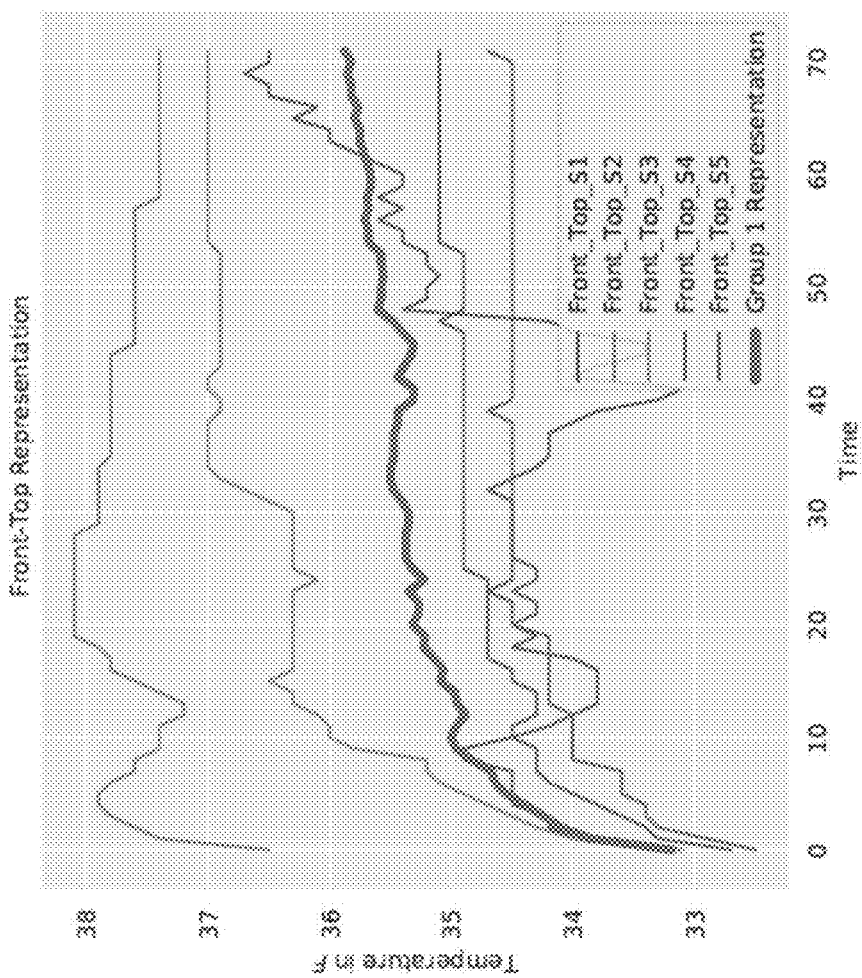
FIG. 12 shows multiple time series temperature data sequences corresponding to a single sensor location for five shipments for a single interval and a time series data sequence representative of all shipments for that location and time interval.

Next, the process orders the data sequences in ascending order with respect to time length. In this case, the ordered set of data sequences is {ship1, ship5, ship3, ship4, ship2} with corresponding lengths {72, 321, 387, 521, 615}. Next, the process creates groups of sensors related to one another in a specific way such as the position inside the container or being in the same shipment. In this example, the process uses position. For example, the Front-Top sensor set is a concatenation of the Front-Top data sequences for Shipments 1, 2, 3, 4, and 5. The component data sequences for each shipment and a resulting representative data sequence for all shipments are shown in FIG. 12.

Figure 11:
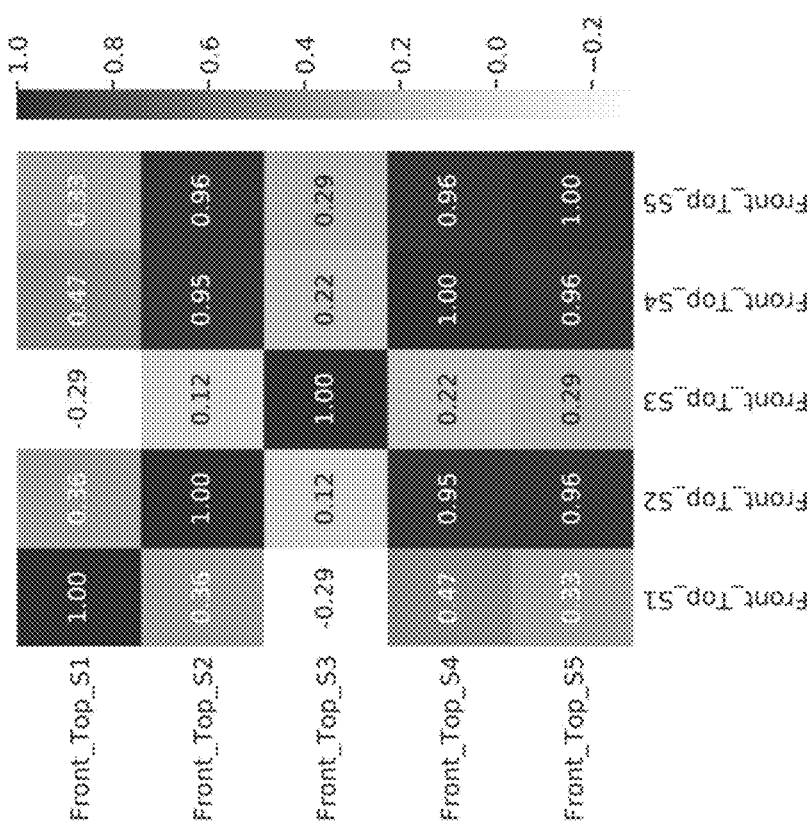
FIG. 11 shows a heatmap representation of a cross-correlation matrix.

The process clips each Front-Top vector in the set to achieve the same size as the shortest vector (72 in this example). Then the process computes k Pearson's Correlation coefficients to form a temporal matrix where k is the number of equal-length time-series data sequences in each group as described above. The process obtains a 5×5 symmetric matrix, where the diagonals are equal to one (representing a time series correlated with itself), where $\sigma_{12}$ represents the Pearson's correlation coefficient between the Front-Top time-series data sequence from the first shipment in the ordered list of shipments and the second ones; in this case the correlation coefficient between shipment 1 and shipment 5. The results of the first Pearson's correlation are shown in the heatmap of FIG. 11. The heatmap reveals the heterogeneity and complexity of the collected multivariate time-series by demonstrating clear differences in the gradient variations across different sensors among different shipments. The gradient levels are driven by the strength of the correlations between the temperature sensors data sequences. Observe that group 1 correlations vary from small negative numbers "weak correlation" to large numbers "strong correlation" to reflect the level of reading consistency of strawberry temperatures among different shipments and location-related sensors.

The process computes normalized weight coefficients for each row in the matrix as follows:

$$W_1 = \sigma_{12} + \sigma_{13} + \sigma_{14} + \sigma_{15}$$

$$W_2 = \sigma_{21} + \sigma_{23} + \sigma_{24} + \sigma_{25}$$

$$W_3 = \sigma_{31} + \sigma_{32} + \sigma_{34} + \sigma_{35}$$

-continued $$W_4 = \sigma_{41} + \sigma_{42} + \sigma_{43} + \sigma_{45}$$

$$W_5 = \sigma_{51} + \sigma_{52} + \sigma_{53} + \sigma_{54}$$

$$W_{total} = W_1 + W_2 + W_3 + W_4 + W_5$$

$$W_{k=5}^{[1]} = \frac{W_1}{W_{total}}; \; W_{k=5}^{[2]} = \frac{W_2}{W_{total}};$$

$$W_{k=5}^{[3]} = \frac{W_3}{W_{total}}; \; W_{k=5}^{[4]} = \frac{W_4}{W_{total}}; \; W_{k=5}^{[5]} = \frac{W_5}{W_{total}}$$

where each of the values $W_{k=5}^{[5]}$ is the normalized weight for the shortest data sequence in the first group. For example, $W_{k=5}^{[5]}$ is the normalized weight for the first 72 timestamps of the longest data sequence for the Front-Top sensor.

Figure 13:
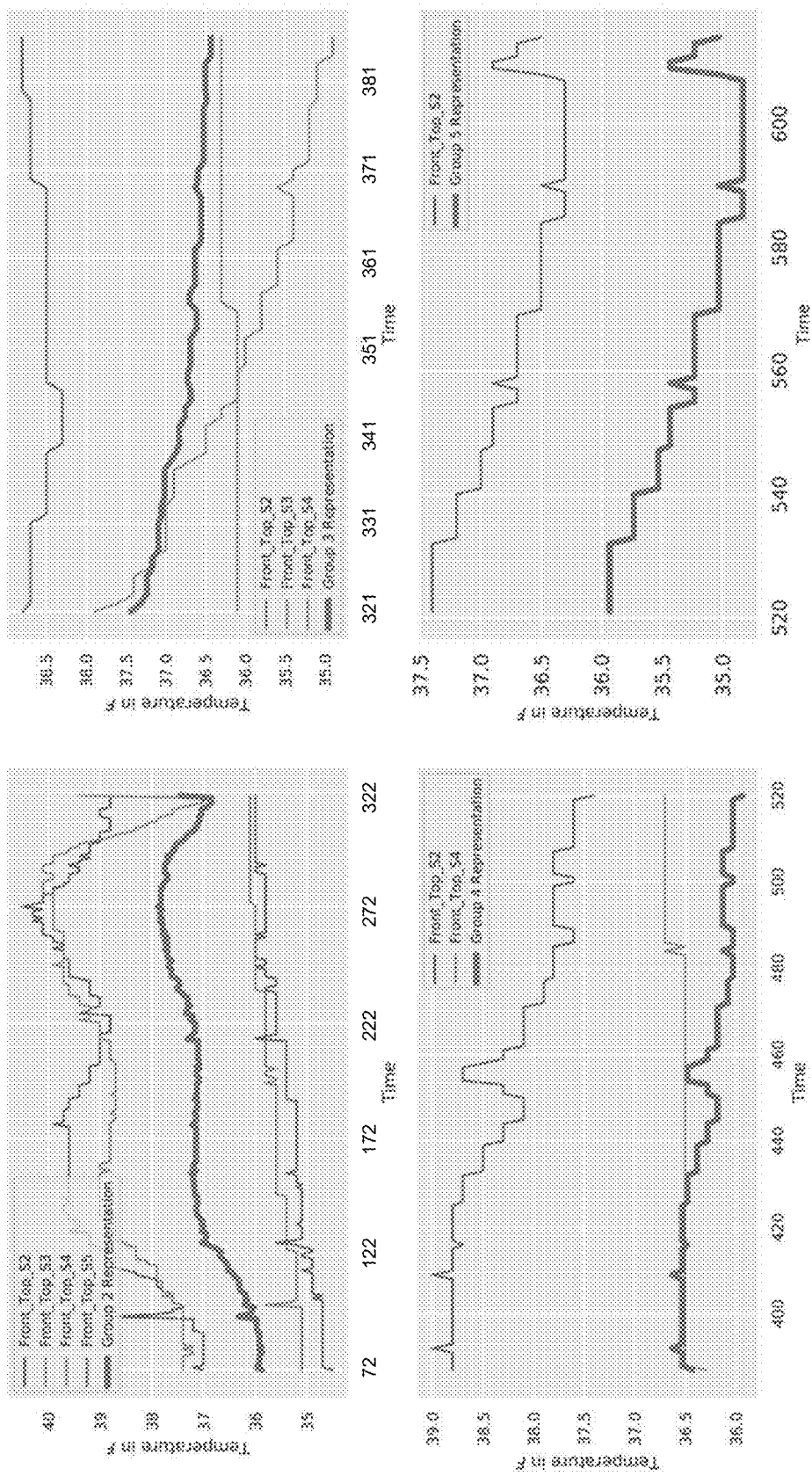
FIG. 13 shows temperature data sequences from multiple sensors locations for each of five produce shipments.
Figure 14:
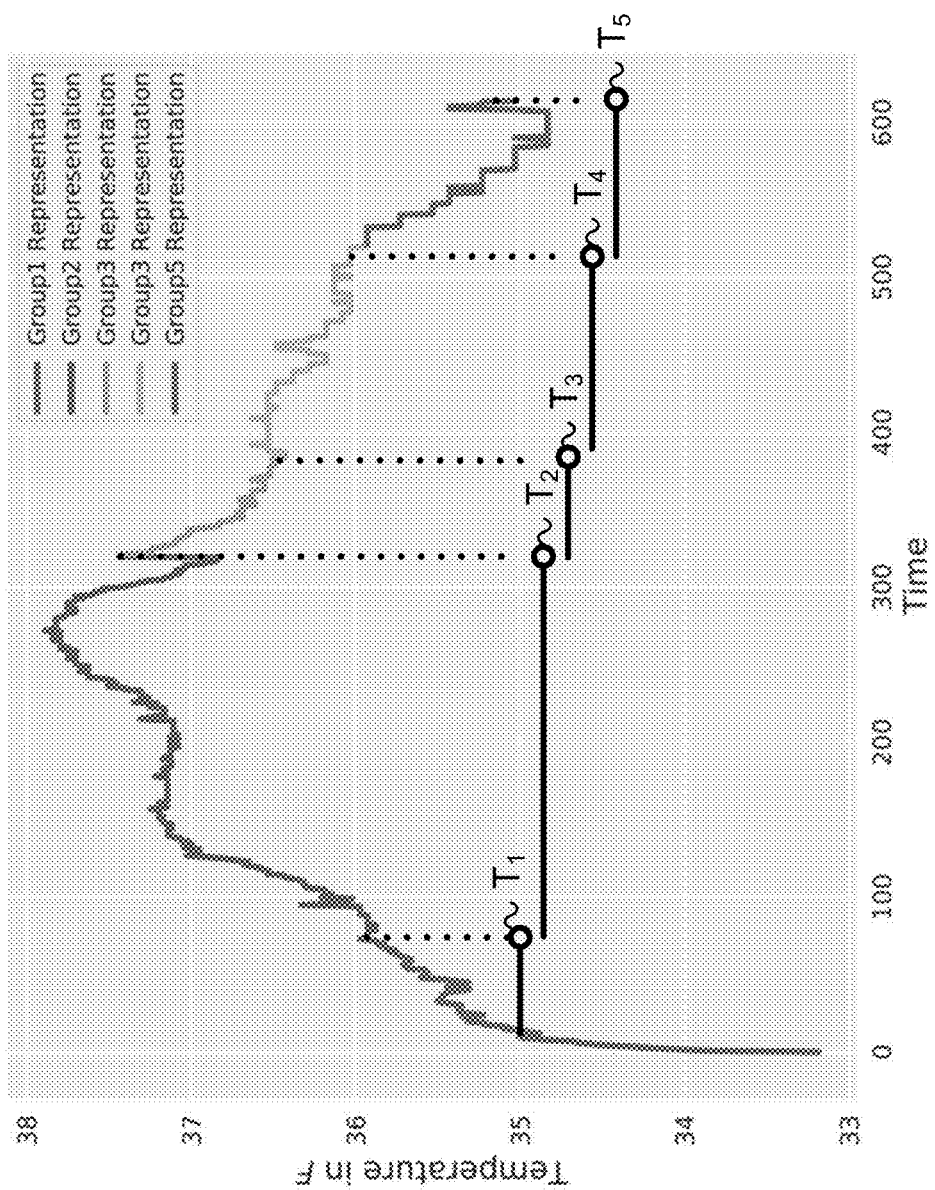
FIG. 14 shows a composite time series data sequence generated from the data sequences of FIG. 12 according to embodiments herein.

The process may create the representative signal specific to each group, $W_{k=5}^{[i]}$, as follows:

$$FT_{group1}^{[1]} = W_k^{[1]} \cdot FT_1^{[ship1][0:n^{[0]}]} + W_k^{[2]} \cdot FT_1^{[ship2][0:n^{[0]}]} + W_k^{[3]} \cdot FT_1^{[ship3][0:n^{[0]}]} + W_k^{[4]} \cdot FT_1^{[ship4][0:n^{[0]}]} + W_k^{[5]} \cdot FT_1^{[ship5][0:n^{[0]}]}$$

where k=5, $n^{[0]}$=72, and F^T denotes the Front-Top position ('[^.]' denotes a representation of particular group of measurements). The resulting group-specific representation for group 1 is shown by FIG. 12. The same procedure is repeated by removing shipment 1 from the ordered list and taking the next 73:321 samples for the remaining 4 vectors to generate a new 4×4 correlation matrix and following the same procedure. The other four group-specific representations are shown in FIG. 13. Finally, the overall combined representation for the Front-Top sensor is shown in FIG. 14, in which the contribution of each grouping is visible as a distinct interval within the entire time extent of the representative data sequence for the FT position across all shipments. This representative data sequence can be used in location-based predictions for wireless sensor networks and data analytics applications, where physical sensors can be removed, and their readings predicted using other sensors. The time intervals {$T_1$, $T_2$, $T_3$, $T_4$} are labeled to show the time intervals corresponding to each of the four group-specific representations which are concatenated in order to produce the representative data sequence over the entire time interval.

Figure 15:
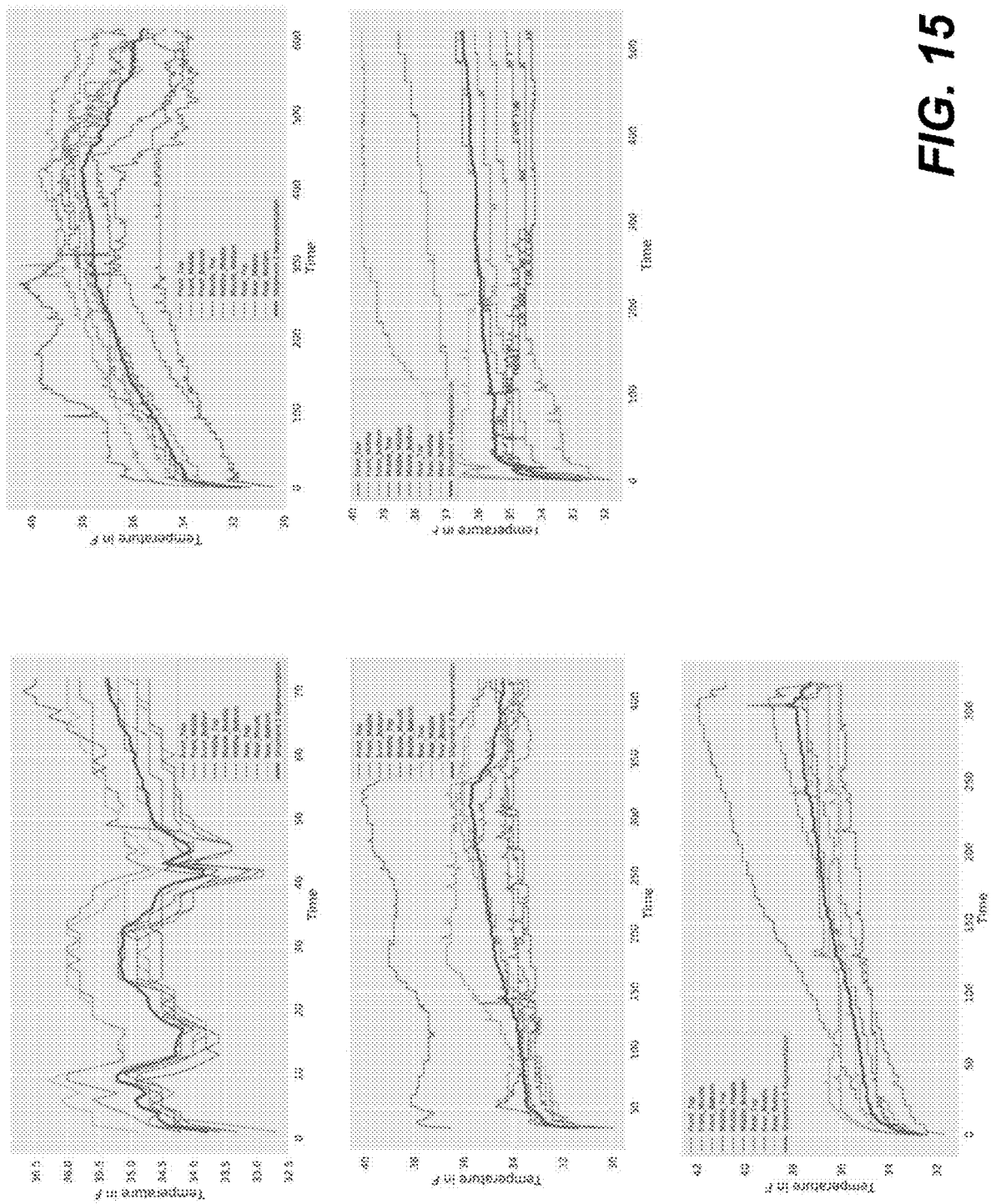
FIG. 15 shows plots of temperature data sequences from multiple shipments, and a representative data sequence generated for each shipment according to embodiments herein that represents the aggregate behavior of all sensor data sequences for that shipment.

The preceding example demonstrates how to generate a shipment independent representative data sequence for a given sensor position across all shipments. The same techniques can be applied to generate a representative data sequence for a given shipment across all sensor positions. FIG. 15 shows the individual sensor data sequences for each of the shipments 1-5 above, and the representative position-independent data sequence for each shipment.

FIG. 16 shows four alternative representations. In FIG. 16 data sequences for each shipment are grouped together by sensor location and a data sequence that represents the sensor signal for that location across all shipments is shown. The four example sensor locations are the rear top, rear middle, middle bottom, and rear bottom locations.

Figure 17:
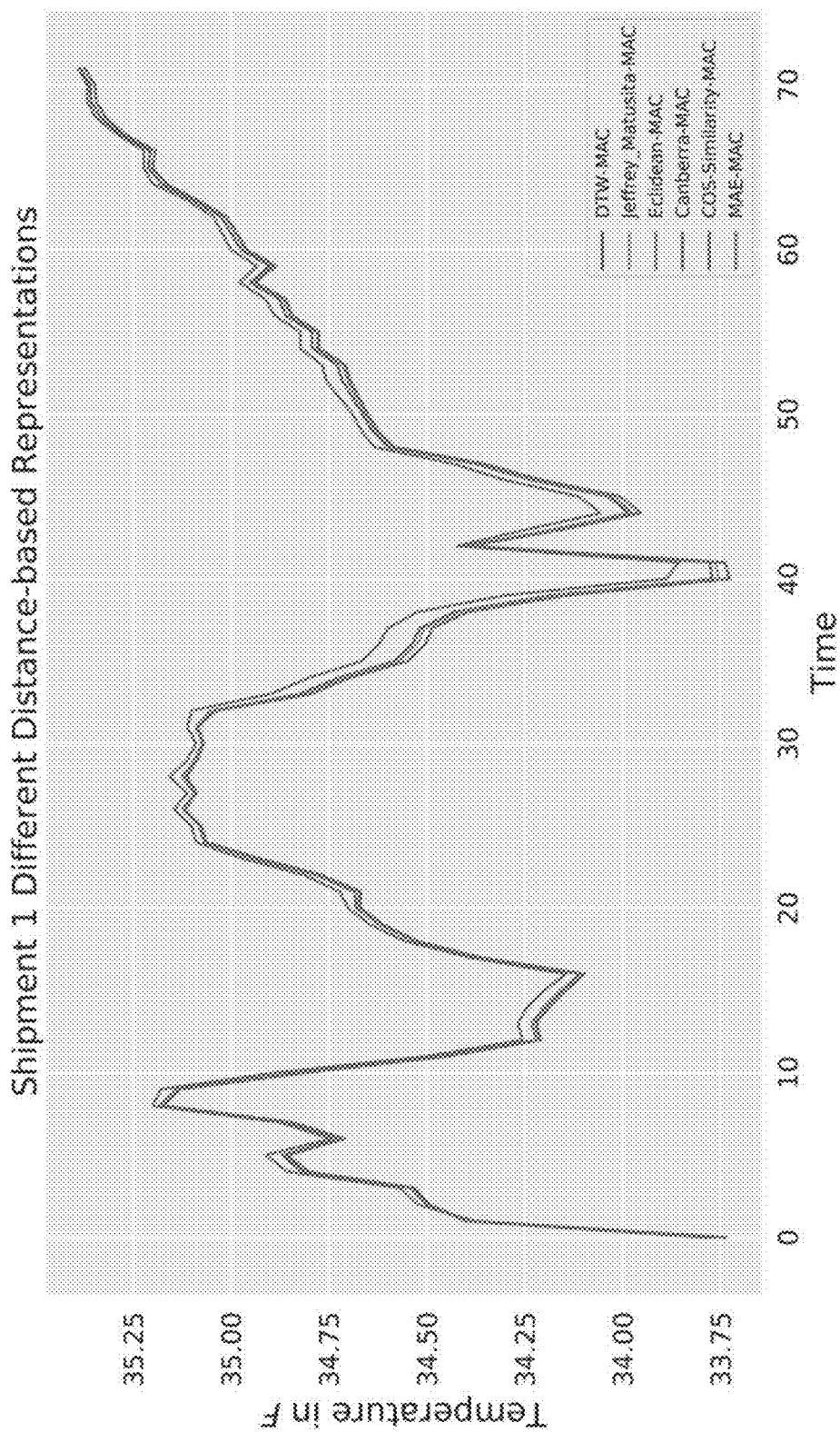
FIG. 17 shows six representative time series data sequences for one shipment generating using the same inputs according to embodiments herein using different weighting functions.

Above, this example process uses similarity measures of which the Pearson correlation coefficient and dynamic time warping similarity are non-limiting examples, to perform weighting. However, embodiments can accommodate other similarity or distance metrics to compare different sets of representations. Results using various similarity/distance measures are very similar regardless of the measure used, as illustrated by FIG. 17 which shows six possible representative data sequences produced from the same component data sequences using different weighting methods. The distance between two sensors varies based on the distance selection, but since the values are subsequently normalized between zero and one, only minor differences in the final representations result. These results highlight the flexibility of the systems and methods disclosed herein in 1 allowing a wide variety of similarity and distance metrics to be used.

The following similarity measures were compared with the DTW-MAC based-distance measure: the Euclidean distance, the mean absolute error, the Canberra distance, and the Jeffries-Matusita distance. Lower values of these distance metrics indicates that two time-series data sequences are more similar. By contrast the cosine similarity metric produces higher values when two data sequences are more similar to each other. Expressions for these metrics are:

$$d_{Euclidean} = \sum_{i=1}^{n[j]} \sqrt{(x_i^j - y_i^j)^2}$$

$$MAE = \sum_{i=1}^{n[j]} |x_i^j - y_i^j|$$

$$d_{Canberra} = \sum_{i=1}^{n[j]} \frac{|x_i^j - y_i^j|}{|x_i^j| + |y_i^j|}$$

$$d_{Jeffreys\text{-}Matusita} = \sqrt{\sum_{i=1}^{n[j]} \left(\sqrt{x_i^j} - \sqrt{y_i^j}\right)^2}$$

$$Cos_{Similarity} = \frac{\sum_{i=1}^{n[j]} x_i^j y_i^j}{\sqrt{\sum_{i=1}^{n[j]} (x_i^j)^2} \sqrt{\sum_{i=1}^{n[j]} (y_i^j)^2}}$$

where $x_i^j$ and $y_i^j$ denote the multivariate time-series data from two different sensors either in the same shipment or across different shipments; the subscript i indicates the sensor ID (i.e., location) and the superscript j indicates the shipment number for that sensor (i.e., first, second, etc.).

Figure 18:
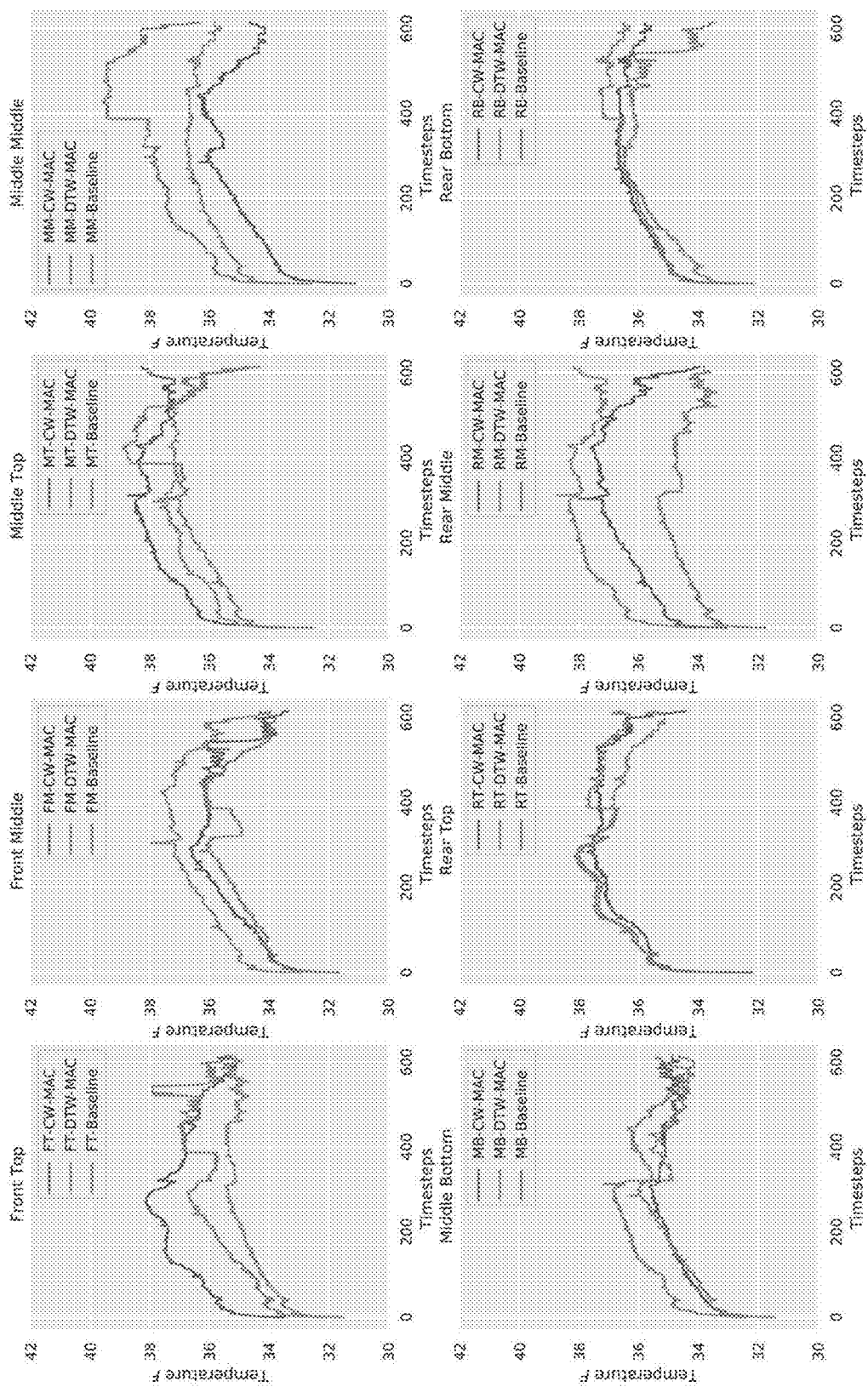
FIG. 18. shows representative time series data sequences representing temperatures for five shipments for each of 8 sensor locations, according to embodiments herein using different weighting functions.

FIG. 18 shows representative data sequences for each sensor location corresponding to the data sequences of FIG. 4 when the different weighting methods described above are used (CW-MAC, DTW-MAC, and UW-MAC, or "baseline").

Figure 19:
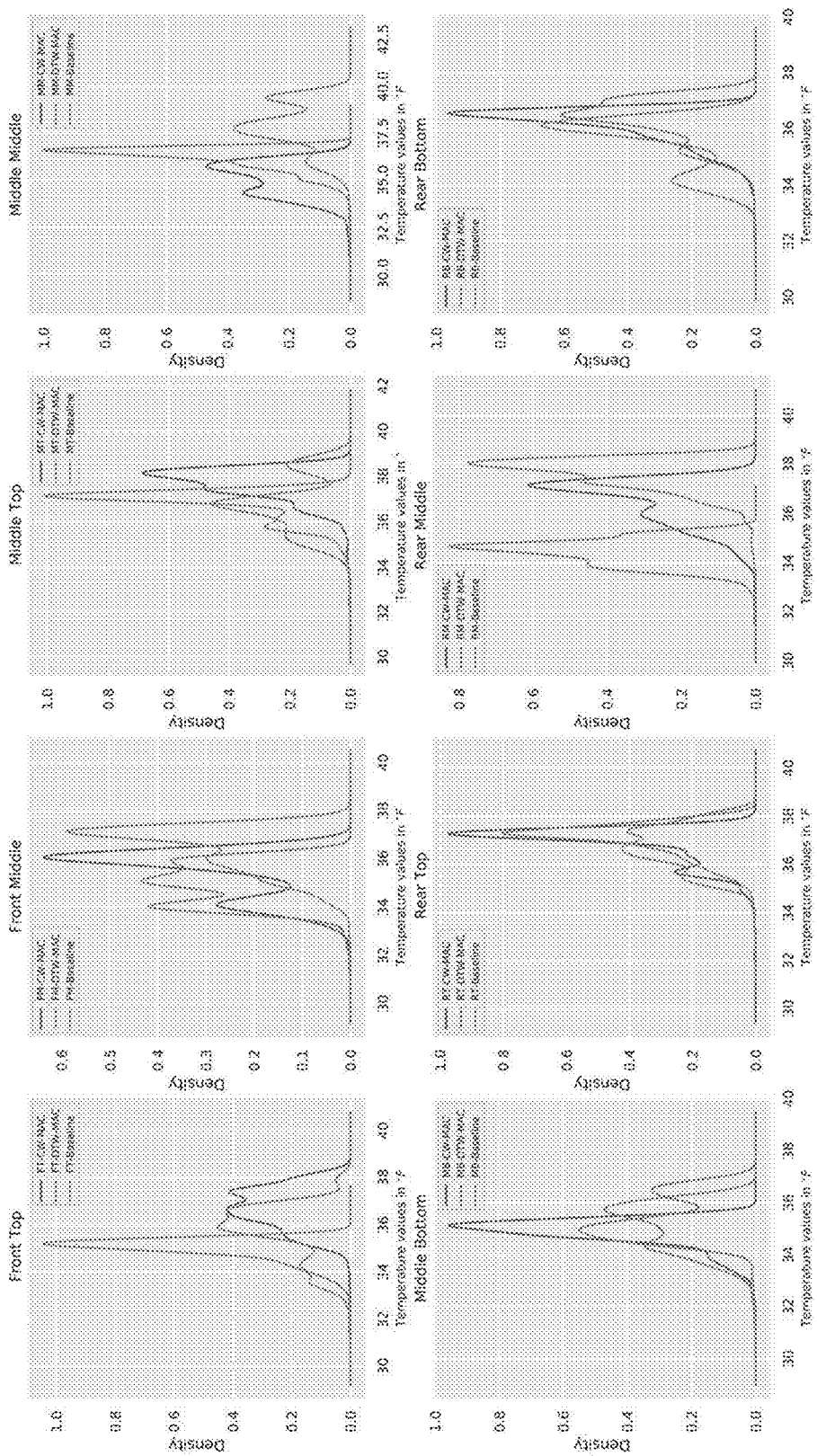
FIG. 19 shows distributions of representative temperature time series data sequences generated according to embodiments herein with various weighting methods.

FIG. 19 shows the distribution of measured temperatures for representative data sequences of each sensor location corresponding to the data sequences of FIG. 4 when the different weighting methods described above are used (CW-MAC, DTW-MAC, and UW-MAC, or "baseline").

Figure 20:
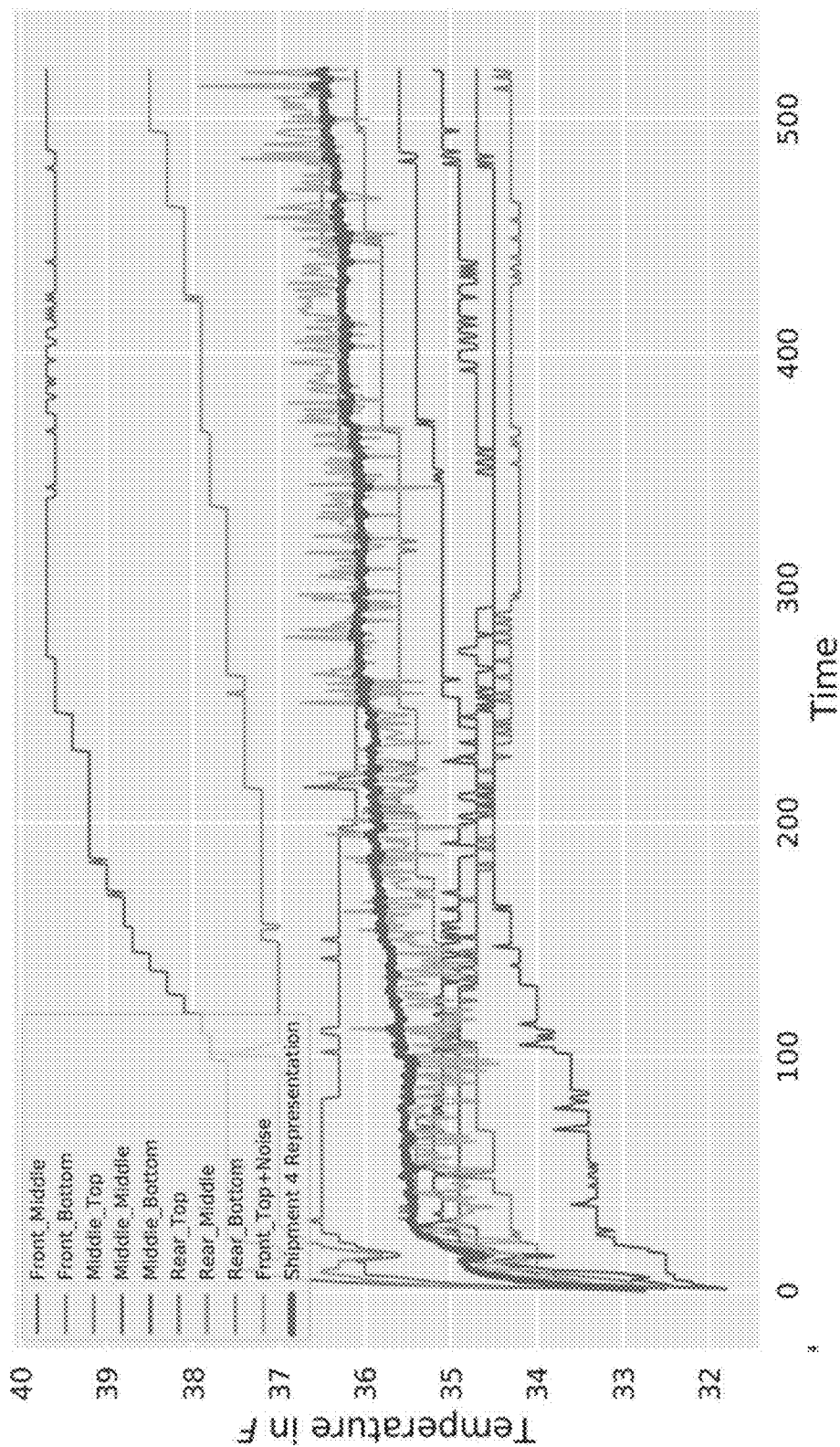
FIG. 20 shows a plot illustrating the robustness of methods herein to the addition of noise when different weighting methods are used.

The robustness of the methods disclosed herein to the addition of random noise were examined for the three difference weighting methods above. Artificial noise was added to one of the sensor sequences (i.e., the Front-Top sensor) for all five shipments. The noise was sampled as a sequence of uncorrelated samples with zero average and unit variance. Given that the multivariate time-series data sequences have different lengths, different noise vectors were created with different lengths commensurate with the lengths of the original sensor time-series data sequences, and separately added noise to each sensor as a process implemented in accordance with methods disclosed herein were performed to produce a representative shipment-level data sequences for all sensor locations. An example result for shipment 4 using CW-MAC is shown in FIG. 20 (choosing DTW-MAC or UW-MAC did not produce significantly different results). The addition of noise is given by the following equations:

$$WN^{n[i]} \sim \mathcal{N}(0,1)$$

$$X_{front\text{-}top}^{ship1^{n[0]}} = X_{front\text{-}top}^{ship1^{n[0]}} + 0.3 * WN^{n[0]}$$

$$X_{front\text{-}top}^{ship2^{n[1]}} = X_{front\text{-}top}^{ship2^{n[1]}} + 0.3 * WN^{n[1]}$$

$$X_{front\text{-}top}^{ship3^{n[2]}} = X_{front\text{-}top}^{ship3^{n[2]}} + 0.3 * WN^{n[2]}$$

$$X_{front\text{-}top}^{ship4^{n[3]}} = X_{front\text{-}top}^{ship4^{n[3]}} + 0.3 * WN^{n[3]}$$

$$X_{front\text{-}top}^{ship5^{n[4]}} = X_{front\text{-}top}^{ship5^{n[4]}} + 0.3 * WN^{n[4]}$$

where $n^{[0]}$ is the length of the shortest Front-Top data sequence.

Figure 21:
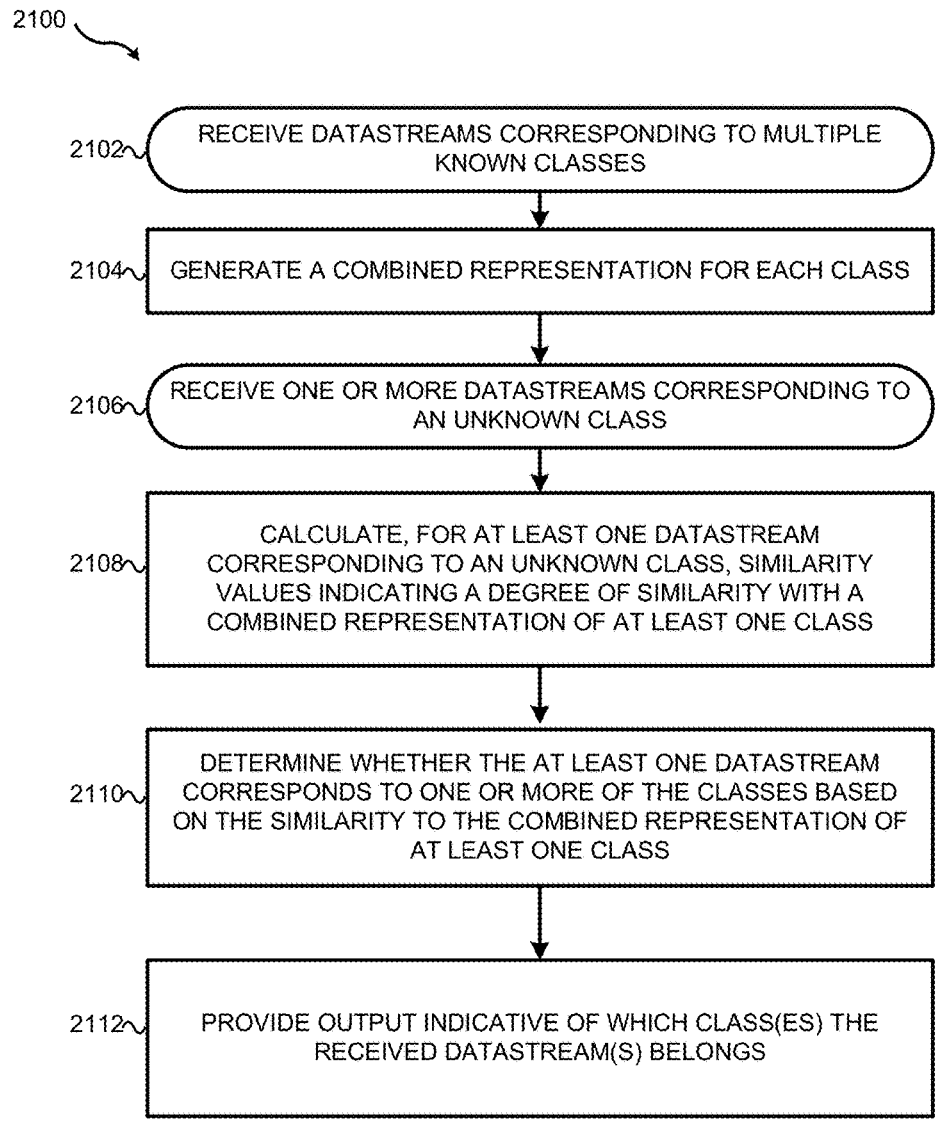
FIG. 21 is a flow diagram illustrating steps of another example process according to embodiments herein.

FIG. 21 illustrates a non-limiting example process 2100 according to embodiments herein. The process 2100 may be performed by a system such as the computing system 100 of FIG. 1. In some embodiments, a data sequence $X_t$ of size n may be a collection of data points measured sequentially over equally spaced intervals (e.g., in time, in space, etc.). For example, data sequence $X_t$ (which may be a time series) may be expressed as $X_t = (x_1, x_2, \ldots, x_n)$, where $x_t \in \mathbb{R}$ is an observation at time t (or other suitable independent variable). A time series may be univariate if observations in the data sequence are recorded over a single variable and may be multivariate if the observations in the data sequence are recorded over multiple variables. Data sequences may also be continuous or discrete based on the interval of measurement. For example, a data sequence may be considered continuous if the observations are measured relatively continuously over a specific time (or other variable along which measurements are taken) interval (e.g., using analog sensors, with a sampling rate below a threshold). As another example, a data sequence may be considered discrete if the observations are measured at equally and discretely spaced intervals (e.g., time intervals) such as minutes, hours, days, etc. A data sequence such as a time series may be represented using graphs where the measurements may be plotted against the time (or other variable) associated with such observations. For example, a dataset $D = [(X_1, Y_1); (X_2, Y_2); \ldots; (X_N, Y_N)]$, where $(X_N, Y_N)$ may be a collections of pairs $(X_i, Y_i)$ in which $X_i$ may be a univariate or multivariate time series, and $Y_i$ may be a corresponding label. In general, time series classification (TSC) may include learning a mapping function between the input series data space and a probability distribution over output class values (e.g., labels associated with the data).

In some embodiments, mechanisms described herein may be used to classify a time series based on a comparison of two data sequences using a distance measure to identify discriminatory features.

Given an input dataset (X, Y), X may include different classes of time series signals, and class i may have m sequences with equal or different lengths, such that the ordered lengths may be represented as $L = (n^{[0]}, n^{[q]}, \ldots, n^{[k]})$, where $n^{[0]}$ is the length of the shortest sequence in class i. Input data X associated with class i may be represented as $X_i = \{X_0^{n[0]}, X_1^{n[1]}, \ldots, X_m^{n[k]}\}$; $X_m^{n[k]} = (x_0, x_1, x_2, x_3, \ldots, x_k)$, where superscripts indicate the length of each data sequence in class i, and subscripts indicate the class number, $X_m^{n[k]} \in \mathbb{R}^{1 \times k}$, and $y_i$ may be class labels, $y_i \in \mathbb{R}^{(m \times 1)}$. Note that the data sequences may be different lengths, as mechanisms described herein (e.g., correlation-weighted moving average coefficient (CW-MAC)) may be used to generate a representation of a class from data sequences with different lengths.

At 2102, the process 2100 may receive component data sequences (e.g., the sensor data sequences 190 of FIG. 1) from any suitable source(s). In some embodiments, each data sequence may be associated with a class i. In some embodiments, process 2100 may register the data sequences to each other using a common reference point (or reference points).

At 2104, process 2100 may generate a combined representation for each class i using techniques described above. For example, process 2100 may use at least a portion of the process 700 to generate a combined representation for each class i.

In some embodiments, given a training set $(X_i, Y_i)$ associated with class i, having m sequences within class i, process 2100 may order the data sequences in an ascending ordering of the signals $X_i$, for i=1, 2, 3, . . . m, with superscripts 1 and m for the shortest and longest sequences, respectively: $(X_i^{[1]}, y_1); (X_i^{[2]}, y_2); (X_i^{[3]}, y_3); \ldots ; (X_i^{[m]}, y_m)$.

In some embodiments, the process 2100 may clip the data sequences such that uniform sets of disjoint sequences across multiple groups to calculate a normalized similarity metric. For example, the process 2100 may compute m temporal Pearson's Correlation matrixes starting by clipping the length of all m−1 signals to have the same length as the shortest signal. The process 2100 can compute a k×k cross-correlation matrix where $\sigma_{ij}$ represents the Pearson's correlation coefficient between data sequences i and j. Pearson's product-moment correlation coefficients may be represented as:

$$\sigma_{xy} = \frac{\sum_{i=1}^{n^{[0]}} (x_i - \bar{x}_i)(y_i - \bar{y}_i)}{\sqrt{\sum_{i=1}^{n^{[0]}} (x_i - \bar{x}_i)^2} \sqrt{\sum_{i=0}^{n^{[0]}} (y_i - \bar{y}_i)^2}},$$

where $\bar{X}_i$ is the average (mean) of the ordered data sequence signals of length $n^{[0]}$, and $n^{[0]}$ is the length of the shortest sequence in the group for the first correlation matrix which includes all m signals.

In some embodiments, the process 2100 may calculate, for each Pearson's correlation matrix, weight coefficients for each signal (e.g., as described above in connection with FIG. 7). For example, the process 2100 may calculate weight coefficients using the following relationship:

$$W_i^{[p]} = \frac{\sum_{j=1}^{k} \sigma_{(p+1)j} - 1}{\left(\sum_{i=1}^{\phantom{k}} \left(\sum_{j=1}^{k} \sigma_{ij} - 1\right)\right)}$$

where p=1, 2, . . . , m represents the normalized weight coefficients for the first, second, . . . , $m^{th}$ data sequence signals, respectively.

In some embodiments, the process 2100 may generate a representative vector for each group in class i. For example, the process 2100 may perform a weighted fusion and concatenation (e.g., as described above in connection with the process 700 of FIG. 7). In such an example, the class may be represented as:

$$\hat{X}_{class_i} = \begin{bmatrix} \chi_i^{[1][0:n^{[0]}]} & \chi_i^{[2][0:n^{[0]}]} & \cdots & \chi_i^{[m][0:n^{[0]}]} \\ 0 & \chi_i^{[2][n^{[0]}:n^{[1]}]} & \cdots & \chi_i^{[m][n^{[0]}:n^{[1]}]} \\ \vdots & \vdots & \ddots & \vdots \\ 0 & 0 & \cdots & \chi_i^{[m][n^{[m-1]}:n^{[m]}]} \end{bmatrix}$$

$$W = \begin{bmatrix} W_m^{[1]} & W_m^{[2]} & \cdots & W_m^{[m]} \\ 0 & W_{m-1}^{[2]} & \cdots & W_{m-1}^{[m]} \\ \vdots & \vdots & \ddots & \vdots \\ 0 & 0 & \cdots & W_1^{[m]} \end{bmatrix}$$

$$X_{Groups} = \begin{bmatrix} \hat{X}_{group_1/y_i}^{[1]} \\ \hat{X}_{group_2/y_i}^{[2]} \\ \hat{X}_{group_3/y_i}^{[3]} \\ \vdots \\ \hat{X}_{group_m/y_i}^{[m]} \end{bmatrix}$$

$$X_{Groups} = \begin{bmatrix} \hat{X}_{group_1/y_i} \\ \hat{X}_{group_2/y_i} \\ \hat{X}_{group_3/y_i} \\ \vdots \\ \hat{X}_{group_m/y_i} \end{bmatrix} = \begin{bmatrix} (X_{n^{[0]} \times K} \times W_K)^T \\ (X_{n^{[1]} \times K-q_1} \times W_{K-q_1})^T \\ (X_{n^{[2]} \times K-q_2} \times W_{K-q_2})^T \\ \vdots \\ (X_{n^{[m]} \times K-q_{m-1}} \times W_{K-q_{m-1}})^T \end{bmatrix}$$

where $W_1^{[m]}=1$, $q_i$ represents the number of profiles in each group, and $X_i^{[m]n^{[m]:1}}$ represents the remaining records of the longest sequence.

$$X_{Groups} = W \circ \hat{X}_{class_i}$$

In some embodiments, the process 2100 may generate a representation of the first group by concatenating vertically all the $\hat{X}^{[i]}_{group_j/y_i}$ to form a data sequence that is representative of all the individual data sequence signals, as follows:

$$\hat{X}^{[Representative]} = [\hat{X}_{group_1/y_i}^{[1]}, \hat{X}_{group_2/y_i}^{[2]}, \ldots, \hat{X}_{group_m/y_i}^{[m]}].$$

In some embodiments, the number of representations in $\hat{X}^{[Representative]}$ may be reconstructed using the following:

$$\begin{bmatrix} X_{n^{[0]} \times K} \\ X_{n^{[1]} \times K-q_1} \\ X_{n^{[2]} \times K-q_2} \\ \vdots \\ X_{n^{[m]} \times K_{q-m}} \end{bmatrix} = \begin{bmatrix} (\hat{X}_{group_1/y_i} \times W_K) \\ (\hat{X}_{group_2/y_i} \times W_{K-q_1}) \\ (\hat{X}_{group_3/y_i} \times W_{K-q_2}) \\ \vdots \\ (\hat{X}_{group_m/y_i} \times W_{K-q_{m-1}}) \end{bmatrix}$$

In some embodiments, at 2104, the process 2100 may generate a representative data sequence for each class.

At 2106, the process 2100 may receive one or more data sequences corresponding to an unknown class. For example, the process 2100 may receive a datastream from a sensor(s) used to measure a phenomenon expected to be associated with a class for which a representative data sequence was generated at 2104. In some embodiments, the process 2100 may receive the one or more data sequences from any suitable source. For example, the process 2100 may receive the one or more data sequences from one or more sensors. As another example, the process 2100 may receive the one or more data sequences from a server (e.g., a remote server). As yet another example, the process 2100 may receive the one or more data sequences from memory.

In some embodiments, the process 2100 may be configured to classify a received unclassified data sequence to determine which class (e.g., of i classes) the unclassified data sequence is most likely to represent. Additionally or alternatively, the process 2100 may be configured to query a set of potentially unclassified data sequences (e.g., in a database) to determine which of the set of data sequences correspond to a particular class. For example, the process 2100 may be configured to retrieve data sequences that are examples of class i using the combined representation corresponding to class i.

At 2108, the process 2100 may determine, for at least one datastream received at 2106, how similar an unclassified data sequence is to a combined representation of at least one class generated at 2104. For example, the process 2100 may calculate similarity values indicating a degree of similarity with a combined representation of at least one class generated at 2104.

In some embodiments, the process 2100 may compare a data sequence representing an unknown class (e.g., an unclassified data sequence) to the representative data sequence for a particular class, and may determine how similar the unclassified data sequence is to that particular class.

In some embodiments, the process 2100 may use any suitable technique or combination of techniques to determine similarity between an unclassified data sequence and a class. For example, the process 2100 may utilize a techniques based on dynamic time warp (DTW) to determine similarity between a data sequence that represents the class, and an unclassified data sequence. For example, process 2100 may utilize DTW to warp a time (or another suitable independent variable) axis of the representative data sequence and/or the unclassified data sequence to achieve a better alignment between the sequences.

In some embodiments, the process 2100 may attempt to align an unclassified sequence and a representative sequence of a class using one or more DTW techniques. For example, the process 2100 may construct an $nx_i \times nx_j$ matrix where the ($i^{th}, j^{th}$) element of the matrix includes a distance $d(X_i, X_j)$ between the two data sequences, $X_i$ and $X_j$ (e.g., the process 2100 may calculate a Euclidian distance, such that $d(X_i, X_j) = \sqrt{\Sigma(X_i - X_j)^2}$). In some embodiments, a DTW warping path may be subjected to various constraints, such as boundary conditions, continuity, and monotonicity, to minimize an overall warping cost as follows:

$$DTW(x, y) = \min\left\{\frac{\sqrt{\sum_{i=1}^{L}(z_i)}}{L}\right\}$$

where L may be used to compensate for the possibility that warping paths may have different lengths. In order to find a minimum path, the warping path Z is contiguous, such that $Z = z_1, z_2, \ldots, z_L$, and $\max(nx_i, nx_j) \leq L < (nx_i + nx_j - 1)$. In some embodiments, the process 2100 may compute a cumulative distance $\zeta(i, j)$ from $d(i, j)$ current position in the matrix and the minimum of the cumulative distances of the adjacent elements, as follows:

$$\zeta(i,j) = d(X_i, X_j) + \min\{\zeta(i-1, j-1) + \zeta(i-1, j) + \zeta(i, j-1)\}.$$

At 2110, the process 2100 may determine whether the at least one datastream (e.g., whether each of the datastreams) received at 2106 corresponds to one or more of the classes based on the similarity between the combined representation of the at least one class, and the unclassified datastream(s).

In some embodiments, the process 2100 may determine that an unclassified datastream is a member of a particular class based on the cumulative distance calculated when comparing the unclassified datastream and the representative data sequence for the class. For example, where the cumulative distance is lower, the likelihood that the datastream is a member of that particular class is higher.

In some embodiments, the process 2100 may determine which class an unclassified datastream is most likely to be a member o based on the cumulative distance for each class calculated when comparing the unclassified datastream and the representative data sequence for each class.

At 2112, the process 2100 may provide an output indicative of which class or classes the received unclassified datastream is a member. In some embodiments, the process 2100 may output identifying information of the class (e.g., an index associated with the class, a semantically meaningful name, etc.) to which a particular unclassified datastream belongs. Additionally or alternatively, the process 2100 may output information indicative of a likelihood that the unclassified datastream is a member of the class (and/or one or more additional classes). For example, the process 2100 may output information indicative of a cumulative distance between the unclassified datastream and the representative data sequence associated with a class.

Figure 22:
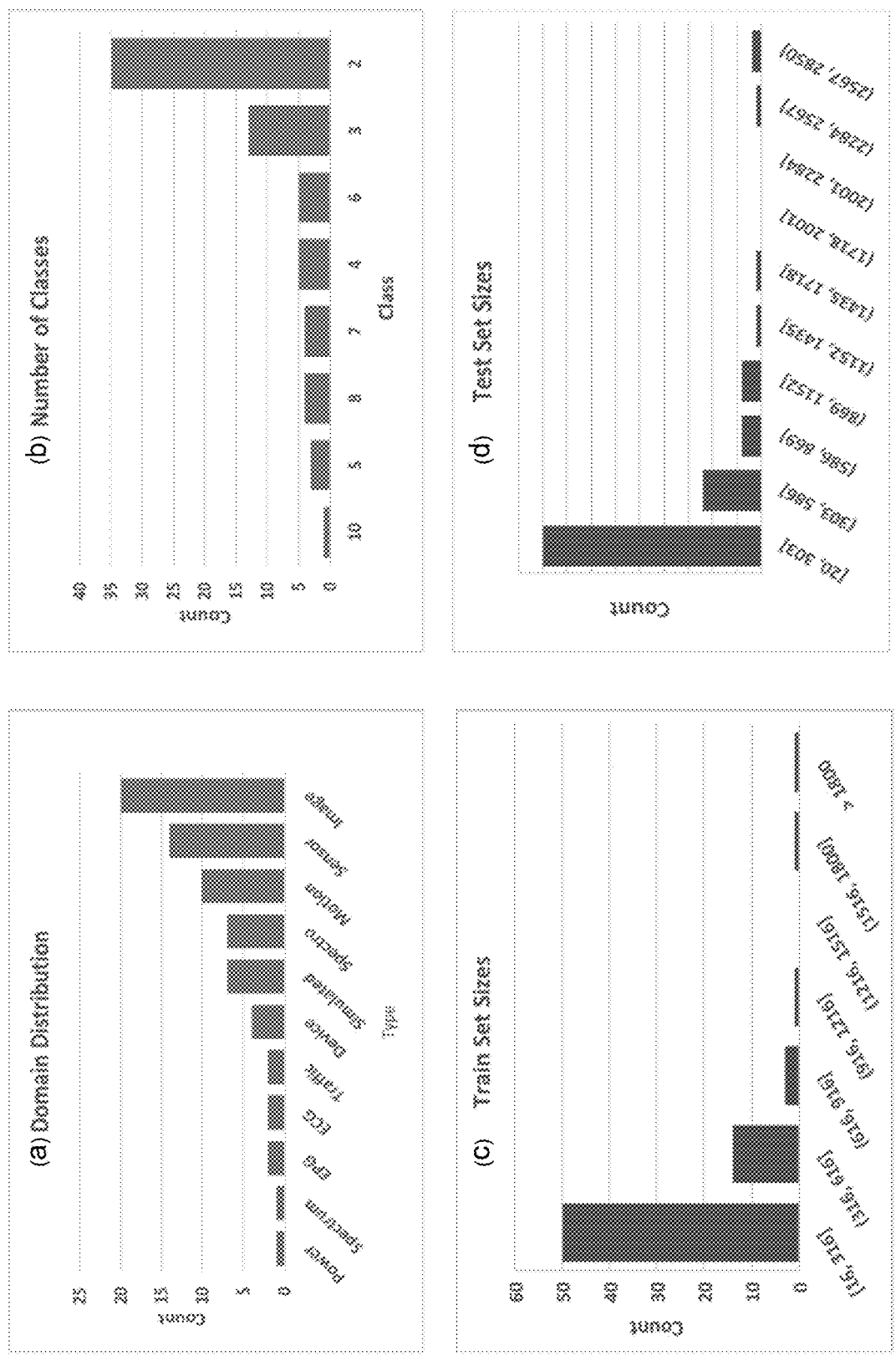
FIG. 22 shows a graphical summary of datasets from a repository of time series data hosted by the University of California, Riverside (UCR repository) used to generate and test representative data sequences in accordance with some embodiments of the disclosed subject matter.

FIG. 22 shows a graphical summary of datasets from a repository of time series data hosted by the University of California, Riverside (UCR repository) used to generate ad test representative data sequences in accordance with some embodiments of the disclosed subject matter. Mechanisms described herein were evaluated on a large publicly available benchmark for time series analysis, specifically UCR archive time series datasets, which have been widely used as a standard for evaluating time series classification techniques. The time series in the archive are already z-normalized to have a zero mean and unity standard deviation. These datasets cover a wide spectrum of different problems, applications, number of classes, lengths of time series, as well as sizes of training and testing sets. Classification results described below were generated based on 70 datasets from the UCR archive. FIG. 22, panel (a) shows distributions of problem types/domains in the datasets, panel (b) show number of datasets with various numbers of classes, panel (c) shows time series lengths of the training datasets, and panel (d) shows time series lengths of the test datasets. Many of the datasets were created at different places, and laboratories, and hence the archive is large and diverse. Default training and testing set splits provided by UCR were used. The selected collection was varied in terms of data characteristics: the lengths of the time series ranges from 15 timestamps (SmoothSubspace) to 1500 timestamps (SemgHandGenderCh2); train set sizes varied from 16 to 8926 observations; test set sizes varied from 20 to 2850 observations, and the number of classes was between 2 and 10. The bar graphs in FIG. 22 show more detailed histograms. A large number of datasets with small and median training set sizes were used (e.g., twenty-six have 50 or fewer training examples, about a dozen have between 50 and 100, and twenty-three between 100 and 500, and ten have greater than 500 observations). The majority of the data domains correspond to image and sensor classification problems. FIG. 22 includes a summary of domain distributions. DTW was implemented using the simple dynamic programming algorithm without optimizations to speed up execution time (e.g., the focus of the was on classification performance not on computation performance). A window-based constraint was applied (e.g., a Sakoe-Chiba band as described in Sakoe et al., "Dynamic Programming Algorithm Optimization for Spoken Word Recognition," IEEE Transactions on Acoustics, Speech, and Signal Processing (1978)) on the warping path so that the distance the path is allowed to drift does not deviate far from the constructed matrix diagonal. Note that the window size w can non-intuitively improve the classification accuracy of same/different length time series and prevent pathological warping, for example when a section of a sequence maps to a significantly larger section of another (e.g., as described in Ratanamahatana et al., "Everything You Know About Dynamic Time Warping is Wrong," Third Workshop on Mining Temporal Sequential Data (2004)). Note that when the w is equal to zero then the best warping path is generally the diagonal of the DTW constructed matrix, and in that case DTW with w=0 becomes the Euclidean distance. Different window-sizes w were used based on experimentation and simple grid search to find the best w for DTW computations for each dataset. The parameter values that were searched for the window size w are shown in Table 4 (shown in FIG. 24). The same conditions and seed were run on each problem using both a representative data sequence generated using mechanisms described herein and for a baseline classifier(s). The same training and testing sets were used as provided in the archive. However, for a few datasets that have a large number of observations and longer lengths, a smaller subset of observations was used as computing the DTW on the entire testing set was very computationally expensive.

Figure 24:
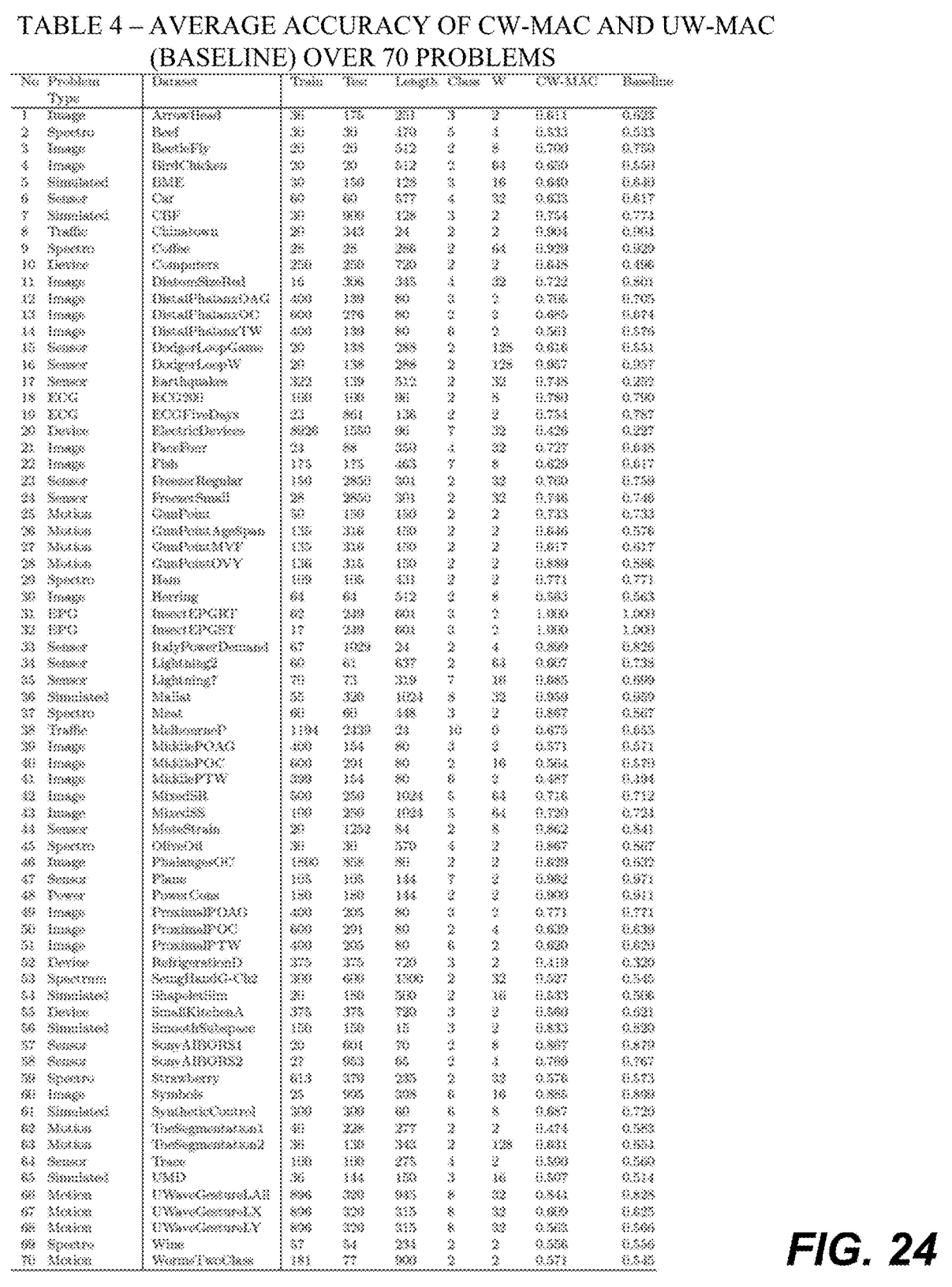

FIGS. 23 and 24 show examples of classification performance of representative data sequences in accordance with some embodiments of the disclosed subject matter. In FIG. 23, Table 2, a best classification accuracy using mechanisms described herein (CW-MAC Accuracy) and a baseline classifier is shown for various domains. As shown in Table 2, mechanisms described herein performed about as well, or better, across the various domains represented in the training data. In FIG. 23, Table 3, a best classification accuracy using mechanisms described herein (CW-MAC Accuracy) and a baseline classifier is shown for various numbers of classes. As shown in Table 2, mechanisms described herein performed about as well, or better, across the various numbers of classes.

FIG. 24, Table 3 shows results of all the datasets in for both a classifier implemented using mechanisms described herein (labeled CW-MAC) and a UW-MAC-based classifier (labeled baseline). Both classifiers performed well on a total of 52 out of 70 datasets with classification accuracy greater than 60%. Within the 52 datasets, CW-MAC had an accuracy greater than 70%, 80% and 90% on 13, 9 and 6 datasets, respectively, with 100% on 2 datasets. This result verifies the effectiveness of mechanisms described herein for use in classification in different problem domains. They also indicate that mechanisms described herein can capture dynamics and statistics of the underlying processes represented in time-series data. A classifier generated using mechanisms described herein mainly considers finding representations from a relatively simple combination of the time series within the same class based on their statistical significance quantified by the weighted Pearson's correlation coefficients. Both classifiers did not perform well on 18 datasets with accuracies between 60% and 42% for CW-MAC, and between 60% and 32% for UW-MAC. The overall average accuracy difference between the CW-MAC-based classifier and the baseline for the domains: device, image, sensor, spectro, and traffic is 2.93%, which highlights the average improvement of utilizing the CW-MAC time series representations with normalized Pearson's weights over the averaging baseline with unity weights. On the other hand, the baseline achieves a higher accuracy of 2.18% for ECG, and 0.28% for spectrum problem types, and average difference of 1.15% for the following problem types: ECG, Motion, Power, Simulated, and Spectrum. For datasets with 2, and 4 classes and type Sensors, 6 datasets (ItalyPowerDemand, MoteStrain, Earthquakes, Car, DodgerLoopGame, Trace) have a combined number of 3,307 time series and an average length of 293 timestamps. The CW-MAC-based classifier implemented using mechanisms described herein shows significant improvements over the baseline on six datasets: Earthquakes, ElectricDevices, Computers, BirdChicken, RefrigerationDevices, and FaceFour. Earthquakes dataset has the second-longest series, and by itself, CW-MAC has an overall improvement of approximately 50% in accuracy over the baseline. A possible reason is that UW-MAC can not properly learn the underlying structures and unique patterns of the time series for each class especially if the time series have unequal lengths. Besides, it has limited capacities in learning complicated characteristics by naive averaging. In our experiments, UW-MAC tends to generate simple representations, resulting in low accuracies results for datasets ElectricDevices, and RefrigerationDevices. For Device problem type, the average overall improvement of CW-MAC over the baseline was 38.80% on Computers, RefrigerationDevices, and ElectricDevices with 2, 3, and 7 classes respectively. An average 1.9% improvement is observed on image type datasets: FaceFour, MixedShapes-RegularTrain, DistalPhalanxOutlineCorrect, BirdChicken, and Fish. The maximum and the minimum improvement in the accuracies by a CW-MAC-based classifier over the baseline was 4.68%, and 0.1% for datasets with 7 and 3 classes, respectively. The overall average difference between the two classifiers for the following: 2, 3, 4, 7, and 10 classes is 1.91%, whereas the overall average difference between the two classifiers for the following 6 and 8 classes is insignificant. The summarized results shows that a CW-MAC-based classifier is competitive in solving time series classification tasks across different domains. Since only one representation per class is generated from the training set and these representations are utilized in the testing time. Additionally, utilizing mechanisms described herein can achieve unprecedented gains in data compression and complexity for general time series classification. CW-MAC can also improve performance by leveraging powerful normalized Pearson's weights capability. Our proposed classifier can combine both the benefits of data compression and feature representations, and hence it is expected to perform best when the representations are concatenated with the training set.

Figure 25:
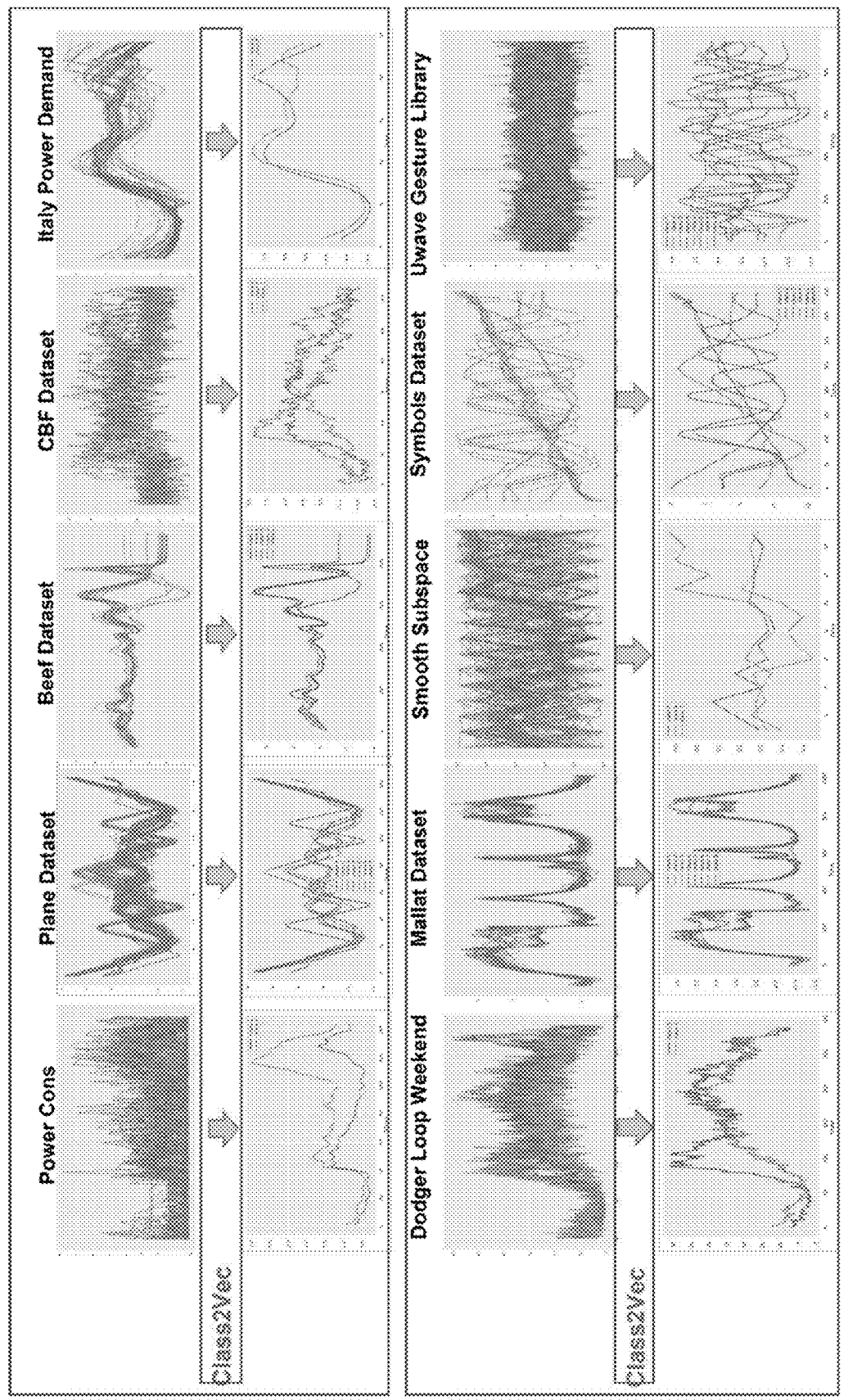
FIG. 25 shows data sequences used to generate representative data sequences in accordance with some embodiments of the disclosed subject matter and representative data for classes associated with the data sequences generated using mechanisms described herein.

FIG. 25 shows data sequences used to generate representative data sequences in accordance with some embodiments of the disclosed subject matter and representative data for classes associated with the data sequences generated using mechanisms described herein. As shown in FIG. 25, mechanisms described herein can facilitate discovering similarities across different classes to find relatively accurate representations of the classes while reducing the time-series dimensionality for back-end applications such as classification. For example, each class can be represented using a single time series.

In some embodiments, any suitable computer readable media may be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that steps of processes described above can be executed or performed in any suitable order or sequence not limited to the order and sequence shown and described in the figures. Also, some of the above process steps can be executed or performed substantially simultaneously where appropriate, or in parallel to reduce latency and processing times.

Although the invention has been described and illustrated in the foregoing illustrative aspects, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method of transforming a set of data sequences, the method comprising:
receiving a plurality of data sequences from respective signal sources;
identifying a shortest data sequence of the plurality of data sequences that corresponds to a first interval;
calculating, for pairs of data sequences of the plurality of data sequences, a similarity value indicative of a degree of similarity between the pairs of data sequences over the first interval;
forming a first segment of a representative data sequence that is a weighted combination of the plurality of data sequences over the first interval wherein each of the plurality of data sequences is weighted based on similarity values associated with that data sequence;
truncating at least a subset of data sequences to exclude elements corresponding to the first interval;
identifying a shortest data sequence of the subset of data sequences that corresponds to a second interval;
calculating, for pairs of data sequences of the subset of data sequences, a similarity value indicative of a degree of similarity between the pairs of data sequences over the second interval;
forming a second segment of the representative data sequence that is a weighted combination of the subset of data sequences over the second interval wherein each of the subset of data sequences is weighted based on similarity values associated with that data sequence; and
concatenating the first segment of the representative data sequence and the second segment of the representative data sequence.

2. The method of claim 1, wherein the shortest data sequence is associated with a plurality of similarity values, each of the plurality of similarity values indicative of a similarity between the shortest data sequence and one of the plurality of data sequences over the first interval.

3. The method of claim 2, wherein one of the plurality of similarity values is indicative of the degree of similarity between the shortest data sequence and itself over the first interval.

4. The method of claim 2, wherein a weight associated with the shortest data sequence is based on a combination of the plurality of similarity values associated with the shortest data sequence, and the first segment is based on values of the shortest data sequence and the weight associated with the shortest data sequence.

5. The method of claim 1, wherein calculating the set of respective similarity values comprises calculating one or more of: a correlation coefficient; a cosine similarity value; a Euclidean distance value; a Manhattan distance value; a mean absolute error value; a Canberra distance value; and a Jeffries-Matusita distance value.

6. The method of claim 1, wherein each of the plurality of data sequences corresponds to a class of a plurality of classes, the method further comprising:
receiving an unclassified data sequence;
comparing the representative data sequence and the unclassified data sequence; and
classifying the unclassified data sequence based on the comparison.

7. The method of claim 6, wherein comparing the representative data sequence and the unclassified data sequence comprises:
performing a dynamic time warping operation between the representative data sequence and the unclassified data sequence.

8. A system for transforming a set of data sequences, the system comprising:
at least one processor configured to:
receive a plurality of data sequences from respective signal sources;
identify a shortest data sequence of the plurality of data sequences that corresponds to a first interval;
calculate, for pairs of data sequences of the plurality of data sequences, a similarity value indicative of a degree of similarity between the pairs of data sequences over the first interval;
form a first segment of a representative data sequence that is a weighted combination of the plurality of data sequences over the first interval wherein each of the plurality of data sequences is weighted based on similarity values associated with that data sequence;
truncate at least a subset of data sequences to exclude elements corresponding to the first interval;

identify a shortest data sequence of the subset of data sequences that corresponds to a second interval;

calculate, for pairs of data sequences of the subset of data sequences, a similarity value indicative of a degree of similarity between the pairs of data sequences over the second interval;

form a second segment of the representative data sequence that is a weighted combination of the subset of data sequences over the second interval wherein each of the subset of data sequences is weighted based on similarity values associated with that data sequence; and concatenate the first segment of the representative data sequence and the second segment of the representative data sequence.

9. The system of claim 8, wherein the shortest data sequence is associated with a plurality of similarity values, each of the plurality of similarity values indicative of a similarity between the shortest data sequence and one of the plurality of data sequences over the first interval.

10. The system of claim 9, wherein one of the plurality of similarity values is indicative of the degree of similarity between the shortest data sequence and itself over the first interval.

11. The system of claim 9, wherein a weight associated with the shortest data sequence is based on a combination of the plurality of similarity values associated with the shortest data sequence, and the first segment is based on values of the shortest data sequence and the weight associated with the shortest data sequence.

12. The system of claim 8, wherein calculating the set of respective similarity values comprises calculating one or more of: a correlation coefficient; a cosine similarity value; a Euclidean distance value; a Manhattan distance value; a mean absolute error value; a Canberra distance value; and a Jeffries-Matusita distance value.

13. The system of claim 8, wherein each of the plurality of data sequences corresponds to a class of a plurality of classes, and the at least one processor is further configured to:

receive an unclassified data sequence;

compare the representative data sequence and the unclassified data sequence; and classify the unclassified data sequence based on the comparison.

14. The system of claim 13, wherein the at least one processor is further configured to:

perform a dynamic time warping operation between the representative data sequence and the unclassified data sequence.

15. A non-transitory computer readable medium containing computer executable instructions that, when executed by a processor, cause the processor to perform a method of transforming a set of data sequences, the method comprising:

receiving a plurality of data sequences from respective signal sources;

identifying a shortest data sequence of the plurality of data sequences that corresponds to a first interval;

calculating, for pairs of data sequences of the plurality of data sequences, a similarity value indicative of a degree of similarity between the pairs of data sequences over the first interval;

forming a first segment of a representative data sequence that is a weighted combination of the plurality of data sequences over the first interval wherein each of the plurality of data sequences is weighted based on similarity values associated with that data sequence;

truncating at least a subset of data sequences to exclude elements corresponding to the first interval;

identifying a shortest data sequence of the subset of data sequences that corresponds to a second interval;

calculating, for pairs of data sequences of the subset of data sequences, a similarity value indicative of a degree of similarity between the pairs of data sequences over the second interval;

forming a second segment of the representative data sequence that is a weighted combination of the subset of data sequences over the second interval wherein each of the subset of data sequences is weighted based on similarity values associated with that data sequence; and concatenating the first segment of the representative data sequence and the second segment of the representative data sequence.

16. The non-transitory computer readable medium of claim 15, wherein the shortest data sequence is associated with a plurality of similarity values, each of the plurality of similarity values indicative of a similarity between the shortest data sequence and one of the plurality of data sequences over the first interval.

17. The non-transitory computer readable medium of claim 16, wherein one of the plurality of similarity values is indicative of the degree of similarity between the shortest data sequence and itself over the first interval.

18. The non-transitory computer readable medium of claim 16, wherein a weight associated with the shortest data sequence is based on a combination of the plurality of similarity values associated with the shortest data sequence, and the first segment is based on values of the shortest data sequence and the weight associated with the shortest data sequence.

19. The non-transitory computer readable medium of claim 15, wherein calculating the set of respective similarity values comprises calculating one or more of: a correlation coefficient; a cosine similarity value; a Euclidean distance value; a Manhattan distance value; a mean absolute error value; a Canberra distance value; and a Jeffries-Matusita distance value.

20. The non-transitory computer readable medium of claim 15, wherein each of the plurality of data sequences corresponds to a class of a plurality of classes, the method further comprising:

receiving an unclassified data sequence;

comparing the representative data sequence and the unclassified data sequence; and classifying the unclassified data sequence based on the comparison.

* * * * *